(12) United States Patent
Takada

(10) Patent No.: US 7,356,488 B2
(45) Date of Patent: Apr. 8, 2008

(54) RESERVATION SYSTEM FOR ARTICLE OR SERVICE, RESERVATION METHOD AND PROGRAM

(75) Inventor: Yuji Takada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 10/161,713

(22) Filed: Jun. 5, 2002

(65) Prior Publication Data
US 2003/0065581 A1 Apr. 3, 2003

(30) Foreign Application Priority Data
Sep. 28, 2001 (JP) ............... 2001-301186
Jan. 23, 2002 (JP) ............... 2002-014240

(51) Int. Cl.
G06Q 30/00 (2006.01)
(52) U.S. Cl. .......................... 705/26; 705/27
(58) Field of Classification Search ............. 705/26–27
See application file for complete search history.

(56) References Cited

U.S. PATENT DOCUMENTS

| 6,823,263 | B1 * | 11/2004 | Kelly et al. ................. 702/3 |
| 2003/0004780 | A1 | 1/2003 | Smith et al. | |

FOREIGN PATENT DOCUMENTS

| JP | 06-266744 | 9/1994 |
| JP | 11-085869 | 3/1999 |
| JP | 2000-105784 | 4/2000 |
| JP | 2001-014409 | 1/2001 |
| JP | 2001-202439 | 7/2001 |
| JP | 2001-256513 | 9/2001 |
| JP | 2001-282949 | 10/2001 |
| JP | 2002-007590 | 1/2002 |

OTHER PUBLICATIONS

Final Decision of Rejection, Mailed May 8, 2007 in the corresponding Japanese Patent Application No. 2002-014240.
Nippon Keizai Shimbun, Local Economy Page (Chiba Prefecture) "Narita Yume Farm Discount Depending on Probability of Precipitation" Nov. 17, 2000, pp. 39.
Nikkei Ryutsu Shimbun, Ozu, Ehime Prefecture, "Price Determined Depending on Probability of Precipitation Special Discount in Rainy Days" Oct. 21, 1995, p. 5.
Notice of Reason for Rejection mailed Dec. 5, 2006 issued in corresponding Japanese Patent Application No. 2002-014240.

* cited by examiner

*Primary Examiner*—Robert M. Pond
(74) *Attorney, Agent, or Firm*—Staas & Halsey LLP

(57) ABSTRACT

A reservation system for an article or a service includes an input module obtaining a weather forecast, a module setting a price of the article or a charge for the service in accordance with the weather forecast obtained, an accept module accepting a reservation for purchasing the article at the set price or a reservation for utilizing the service at the set charge, and a module issuing a reservation number for uniquely identifying the reservation accepted, and identifying a reserver making the reservation from the reservation number when purchasing the article or when utilizing the service.

27 Claims, 22 Drawing Sheets

FIG. 9

RESALE RESERVATION ACCEPT SCREEN

DISPLAY RESALE INFORMATION

* UTILIZABLE DATE
* WEATHER FORECAST CONDITION ON UTILIZABLE DATE/PRESENT CONDITION
* RESALE PRICE ON UTILIZABLE DATE

DISPLAY RESERVATION INPUT SCREEN FOR RESALE USER

* INPUT CREDIT NUMBER
* INPUT TELEPHONE NUMBER
* INPUT NAME
* INPUT E-MAIL ADDRESS
* INPUT INPUT DATE/RESERVATION DATE
* INPUT KEYWORD

DECISION/CANCEL BUTTON

*FIG. 20*

RESERVATION ACCEPT SCREEN

DISPLAY RESERVATION INPUT SCREEN FOR USER
- \* INPUT CREDIT NUMBER
- \* INPUT TELEPHONE NUMBER
- \* INPUT NAME
- \* INPUT E-MAIL ADDRESS
- \* INPUT INPUT DATE/RESERVATION DATE
- \* INPUT KEYWORD
- \* INPUT SELECTION OR NON-SELECTION OF CANCEL OPTION

DECISION/CANCEL BUTTON

RESERVATION SYSTEM FOR ARTICLE OR SERVICE, RESERVATION METHOD AND PROGRAM

BACKGROUND OF THE INVENTION

The present invention relates to an electronic commerce technology for commercial articles or services.

Some of commercial articles as transaction objects might be affected by weathers and fluctuate in their sales. Further, some of services might also be affected by weathers and fluctuate in the number of users. For example, air-conditioners and summer clothes fluctuate in their sales depending on how much the summer is hot. Moreover, sales of tickets for and the number of visitors to an amusement park and the number of participants in an event, fluctuate depending on whether the holiday is rain or fair.

Further, in the case of selling such an article and service on a reservation basis, the number of reservations fluctuate corresponding to a weather forecast on an expected date of utilizing the article or service according to an improved accuracy of the weather forecast.

Hence, there arises a problem to an article vendor or a service provider (e.g., a promoter of an event etc), wherein sales, a facility availability rate or a service utility rate fluctuate depending on whether the weather forecast is desirable or undesirable.

Another problem inherent in a system for selling the article and providing the service without any reservations, is that the number of users fluctuates depending on the weather on the very utilizing date and cannot be ensured with a stability.

SUMMARY OF THE INVENTION

It is a primary object of the present invention, which was devised to obviate the problems inherent in the prior arts, to provide a system schemed to decrease fluctuations in numerical quantity of sales of commercial articles to be sold and in the number of users of services in the field of selling the article or providing the services on a reservation basis, which tend to be affected by weather forecasts or how much the weather is desirable or undesirable.

To accomplish the above object, according to one aspect of the present invention, a reservation system for an article or a service has an input module obtaining a weather forecast, a module setting a price of the article or a charge for the service in accordance with the weather forecast obtained, an accept module accepting a reservation for purchasing the article at the set price or a reservation for utilizing the service at the set charge, a module issuing a reservation number for uniquely identifying the reservation accepted, and a module identifying a reserver making the reservation from the reservation number when purchasing the article or when utilizing the service.

If date of providing the article or the service is limited, the price setting module may set the price in accordance with the weather forecast on the date of providing the article or the service.

Thus, the present reservation system at first sets a sales price of the article or service on the providing date in accordance with how the weather forecast is. For instance, the reservation system sets a 20% discount on such days that rain is forecasted, and so on. Then, the present reservation system accepts a reservation for purchasing the concerned article at the set price. With this contrivance, the user can purchase the article at the discount price set at the reservation irrespective of an actual weather condition on the very utilizing date.

The user is able to purchase, even if the weather becomes fine on the very utilizing date, the article the discount price set at the reservation by showing the reservation number. On the other hand, an article vendor gets an increased possibility of ensuring the number of reservers by reducing the prices on days with a weather forecast showing that weather is undesirable. It is therefore feasible to restrain the fluctuations in the number of users depending on the weather conditions.

Preferably, the accept module accepts a keyword arbitrarily specified together with the reservation and is recorded with a mapping of the reservation number to the keyword, and the reservation system may further have a module making the reserver input the reservation number issued to the reserver and the keyword accepted when issuing the reservation number, and a module identifying the reserver by a process that the recorded reservation number and keyword match with the inputted reservation number and keyword.

Thus, the present reservation system makes the use of the keyword specified by the reserver himself or herself when making the reservation in order to authenticate the identity of the reserver more surely.

Preferably, the reservation system may further have a module having a destination of data transmission inputted, to which data addressed to the reserver are transmitted, a module recording a mapping of the reservation number to the destination of data transmission, a module receiving a request for notifying the destination of data transmission of the reservation number, and a module notifying the destination of data transmission of the reservation number.

Preferably, the destination of data transmission may be an E-mail address or a telephone number of a mobile telephone.

Preferably, the accepting module may accept the keyword arbitrarily specified together with the reservation. The recording module may record mappings between the reservation number, the destination of data transmission and the keyword, and the module receiving the request may have the keyword specified together with the destination of data transmission. The reservation system may further have a module searching for the reservation number by a process that the recorded destination of data transmission and keyword match with the specified destination of data transmission and keyword.

As described above, the present reservation system prompts the user to input the keyword and the destination of data transmission, e.g., a telephone number of a user's own mobile telephone, thus obtaining a one-to-one mapping between the reservation number, the keyword and the mobile telephone number.

The reserver requests the present reservation system from, e.g., the reserver's own mobile telephone to notify of the reservation number, whereby the destination of data transmission (mobile telephone) is notified of the reservation number. Accordingly, the reserver can, even when forgetting the reservation number, be notified of the reservation number and can purchase the article at the price set at the reservation.

Preferably, the input module may periodically obtain a weather forecast, and the price setting module may set the price in accordance with a period of time till the service is provided since the weather forecast has been obtained.

Thus, the present reservation system periodically obtains the weather forecast and changes the price setting corresponding to, e.g., the number of days till the date of selling the article since the weather forecast has been obtained. This scheme makes it feasible to increase the number of reservations by giving the user making an earlier reservation a privilege of getting a larger degree of price change (i.e., a higher discount rate).

Preferably, a reservation system for an article or a service may further have a module determining, based on the weather forecast on the date of providing the article or the service, whether or not a cancel of the article or the service should be permitted. Thus, it is possible to ensure the number of reservers by preventing the cancel even if the weather forecast after the reservation for sale shows an undesirable weather on the very date.

Preferably, a reservation system for an article or a service may further have a module putting the article or the service determined not to be cancelable on resale for a third party. With this scheme, the system can support, even if the cancel of the reservation can not be permitted, recovering the cost thereof through the resale.

Preferably, a reservation system for an article or a service may further have a module having a related article or a related service of the reserved article or the reserved service reserved at a price corresponding to a weather forecast when reserving the article or the service.

Thus, related articles or related services (e.g., a home delivery service of baggage, a service for utilizing a hotel facility and so forth) are reserved simultaneously when reserving the article or the service, whereby the related articles or the related services can be reserved at prices corresponding to the weather forecasts. It is therefore possible to provide the user with a serviceability and to increase the number of reservations.

According to another aspect of the present invention, a reservation system for an article or a service has an input module obtaining a weather forecast, a module setting a price of the article or a charge for the service in accordance with the weather forecast obtained, and an accept module accepting a reservation for purchasing the article at the set price or a reservation for utilizing the service at the set charge. The accepting module includes a module having quitting or non-quitting a request for canceling the accepted reservation promised, and the price setting module sets the price in a way that reflects the promise of quitting the cancel request.

Herein, the scheme of having quitting or non-quitting of the cancel request promised implies showing, for instance, an intention of whether the accepted reservation might be canceled or not. Further, the price setting in a way that reflects the promise of quitting the cancel request implies setting the price high in the case of the reservation if quitting the cancel request is not promised and setting the price low in the case of the reservation if quitting the cancel request is promised.

According to still another aspect of the present invention, there is provided a method carried out by a computer to actualize any one of the functions given above.

According to yet another aspect of the present invention, there is provided a program executed by a computer to actualize any one of the functions described above.

According to a further aspect of the present invention, there is provided a readable-by-computer recording medium recorded with such a program.

As explained above, according to the present invention, it is feasible to a system capable of decreasing fluctuations in numerical quantity of sales of commercial articles to be sold and in the number of users of services in the field of selling the article and providing the services on a reservation basis, which tend to be affected by weather forecasts or how much the weather is desirable or undesirable.

BRIEF DESCRIPTION OF THE DRAWINGS

FIG. 9 is a diagram showing an image of a resale reservation accept screen in the reservation system;

FIG. 20 is a flowchart showing an image of a reservation accept screen in the reservation system in the fourth embodiment;

DETAILED DESCRIPTION OF THE PREFERRED EMBODIMENTS

Preferred embodiments of the present invention will hereinafter be described with reference to the accompanying drawings.

First Embodiment

Figure 1:
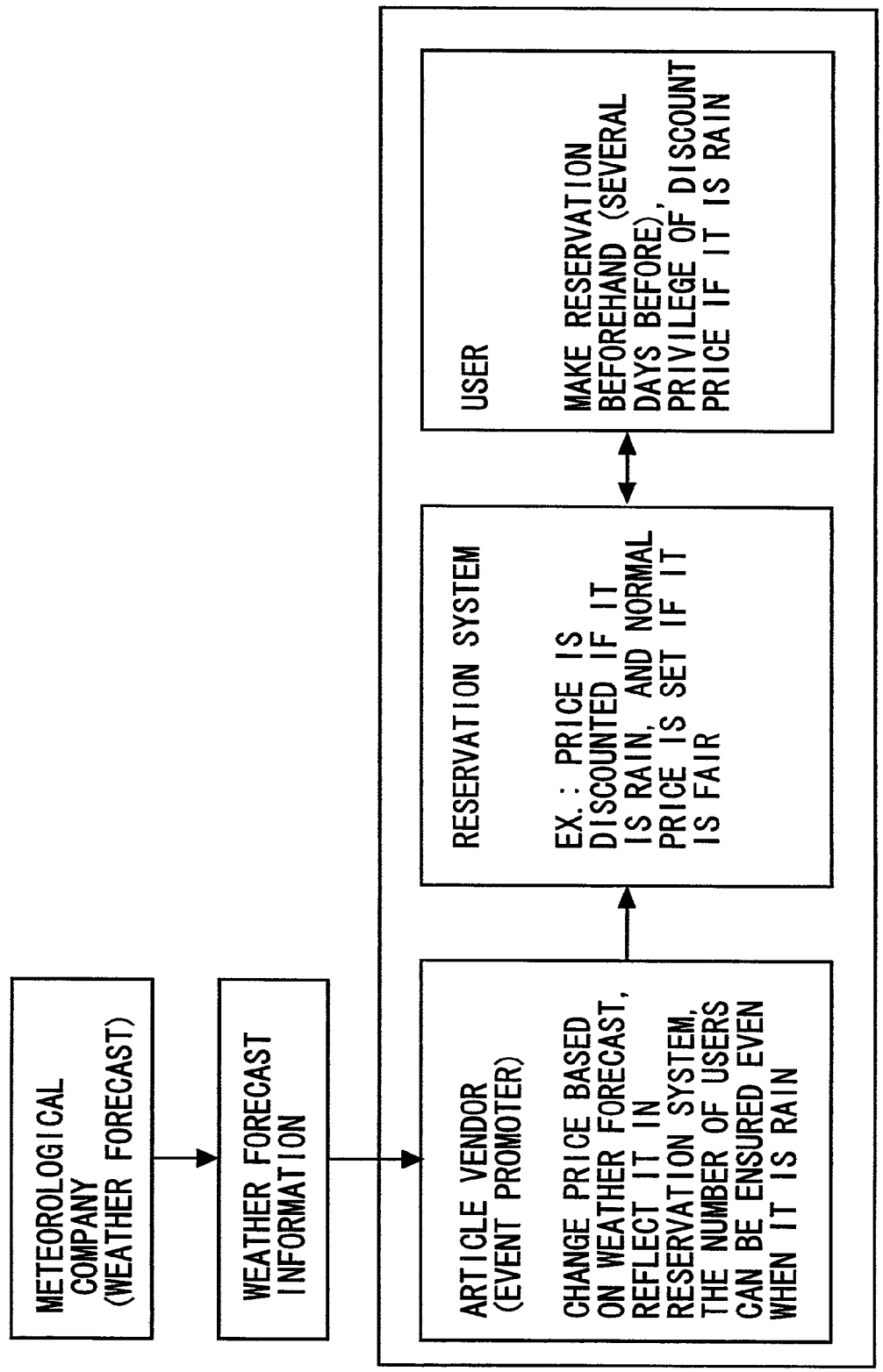
FIG. 1 is a diagram showing a principle of a reservation system in a first embodiment of the present invention.
Figure 2:
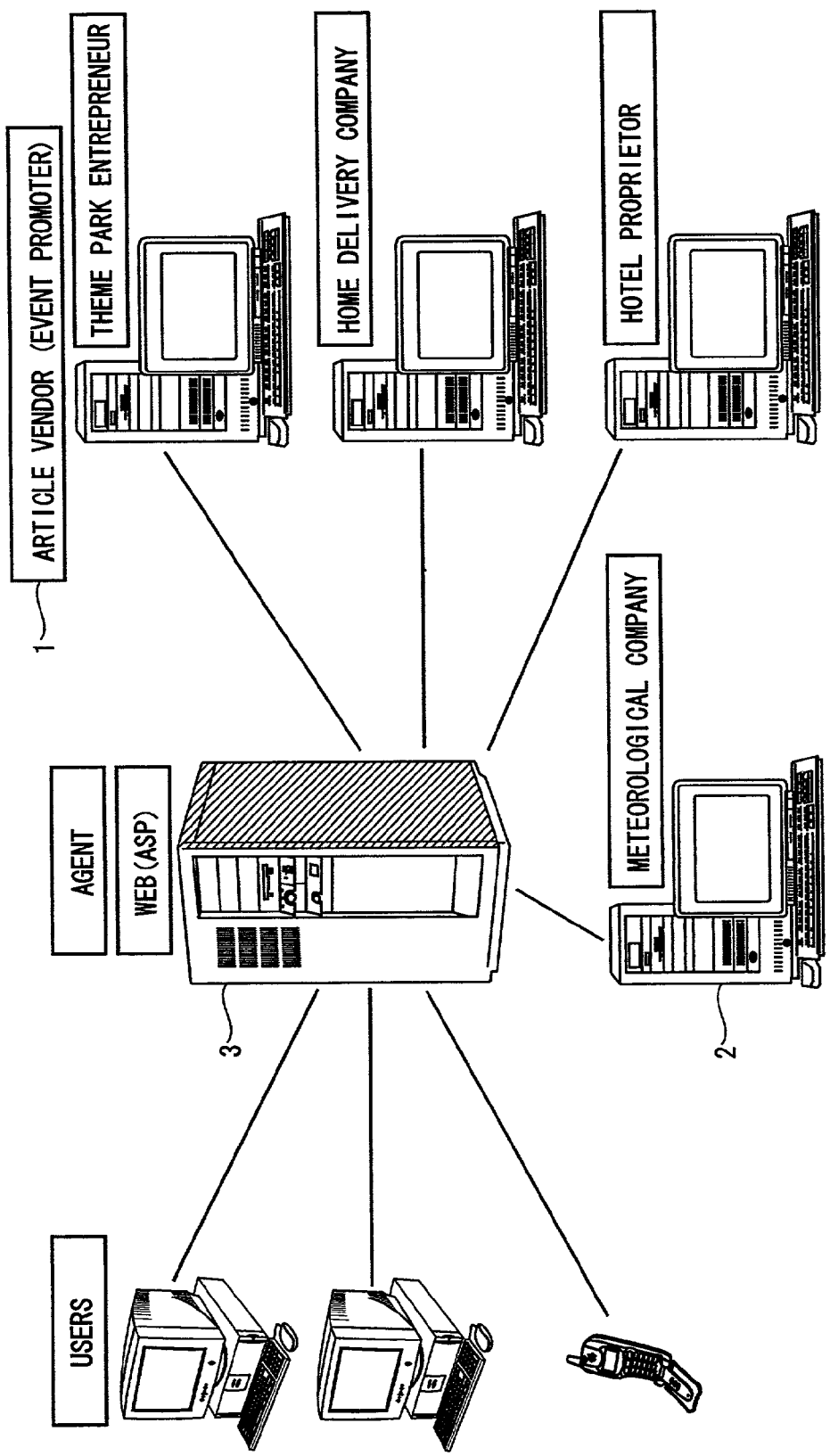
FIG. 2 is a view illustrating a system architecture of the reservation system.
Figure 3:
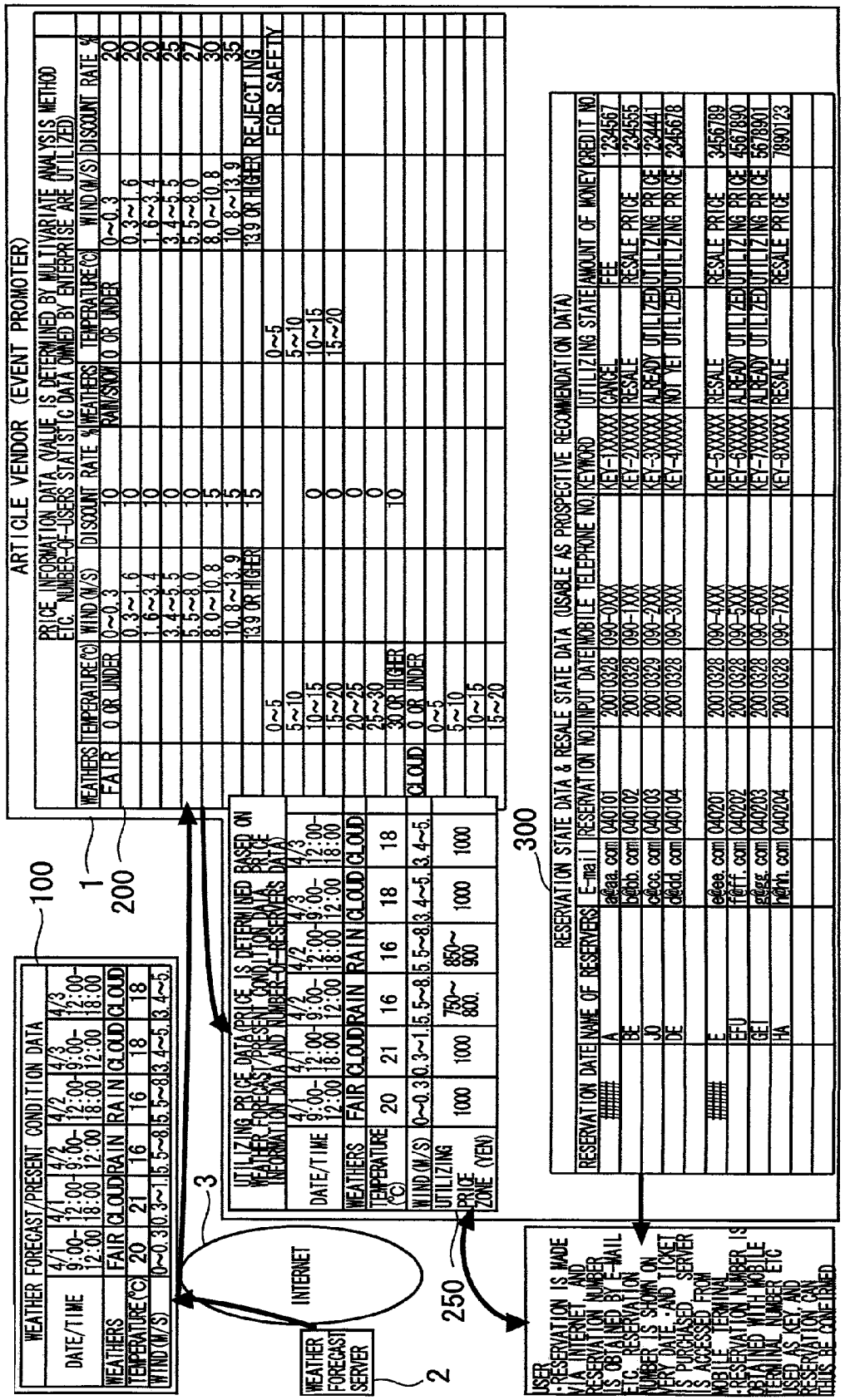
FIG. 3 is a diagram showing data structures of data managed by the reservation system in the first embodiment.
Figure 4:
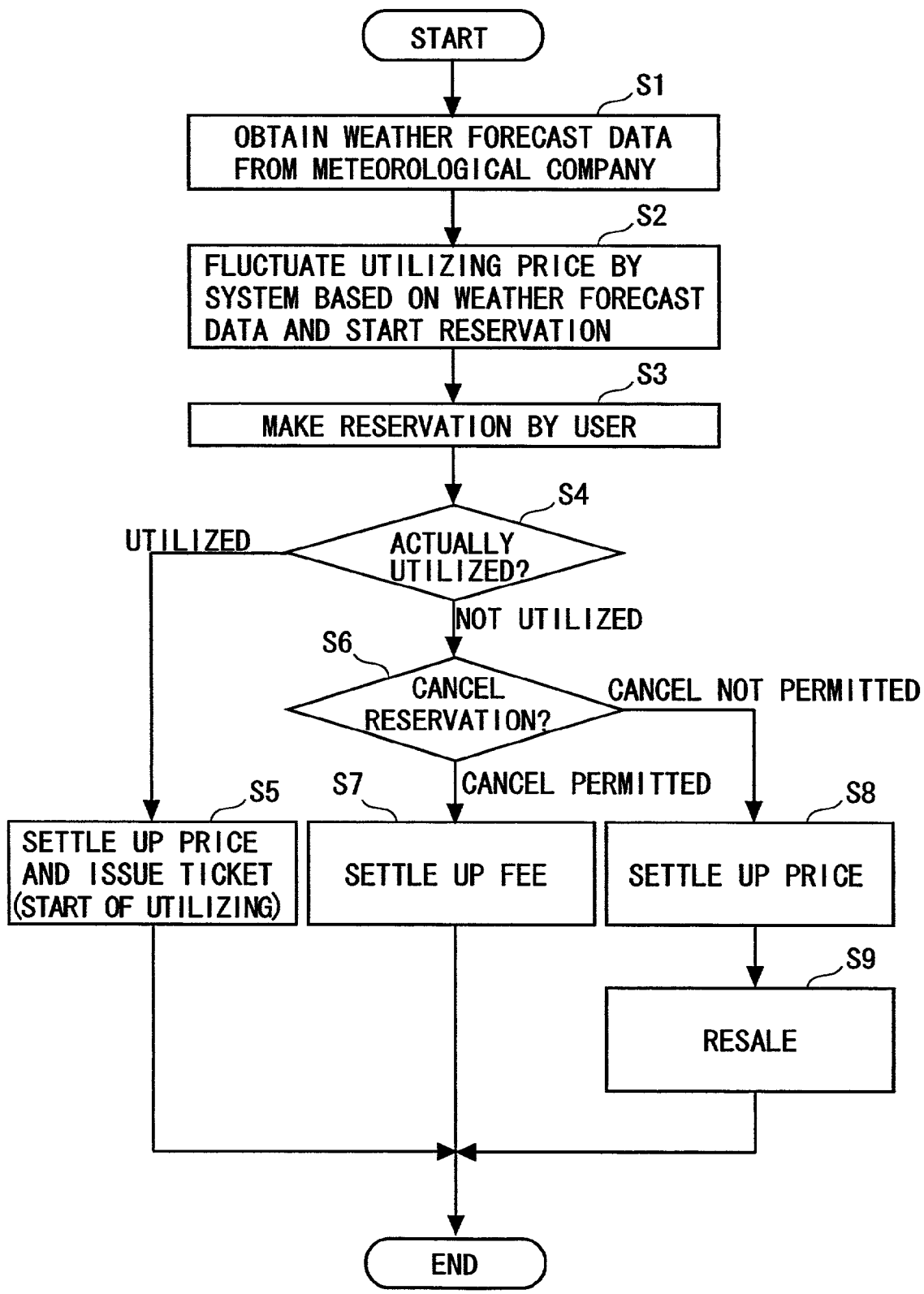
FIG. 4 is a flowchart showing an outline of processes in the reservation system.
Figure 5:
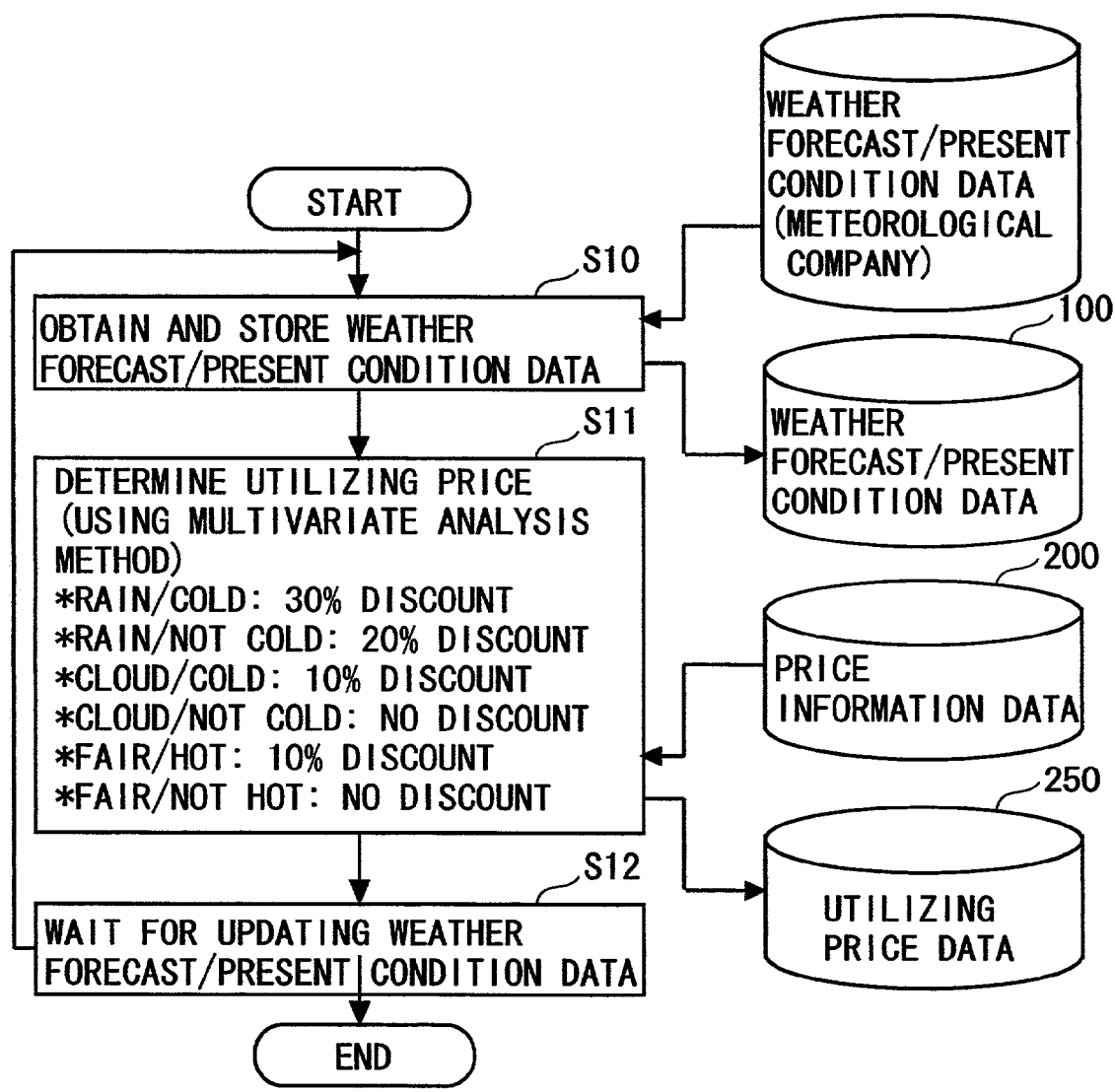
FIG. 5 is a flowchart showing a price determining process in the first embodiment.
Figure 6:
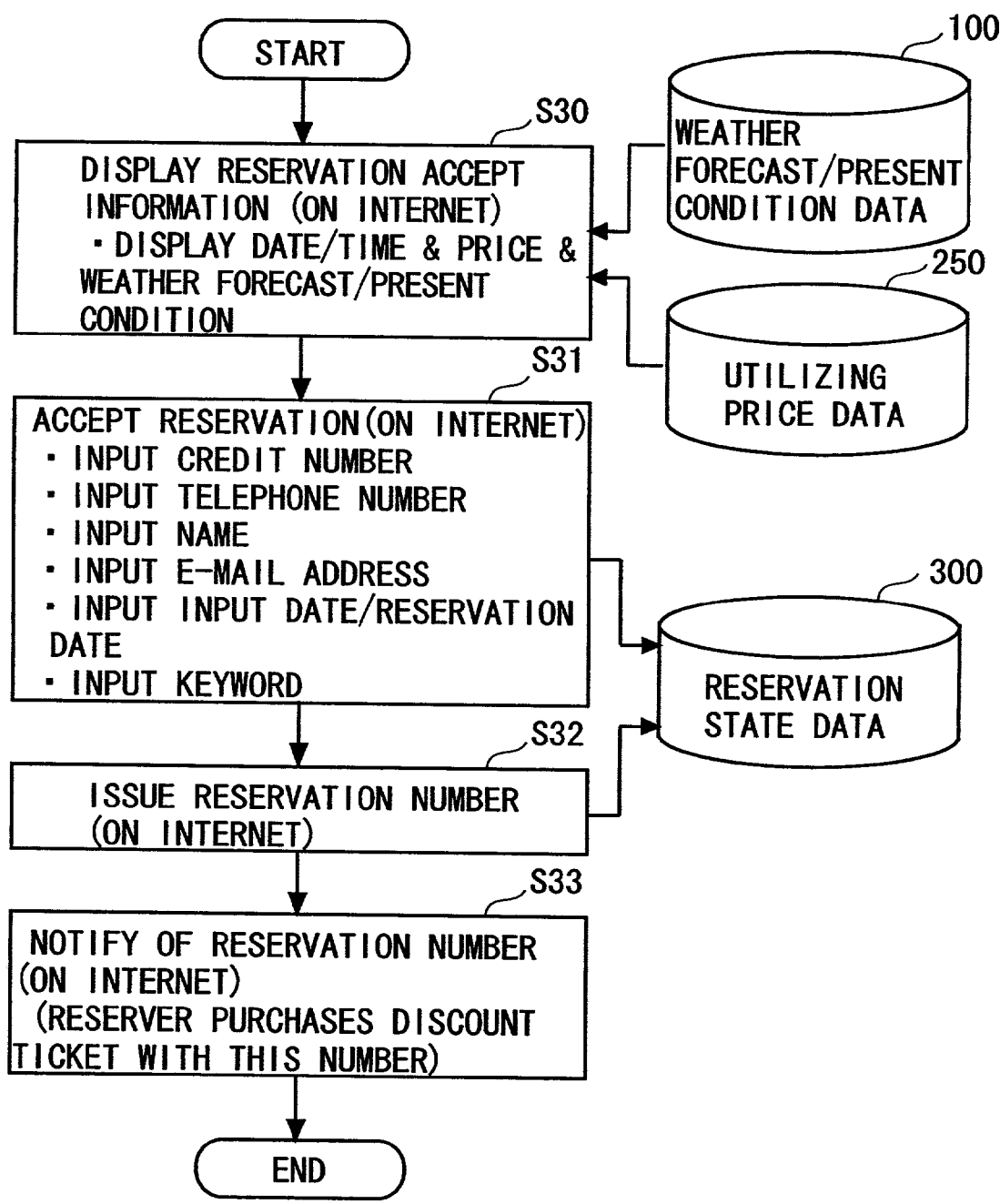
FIG. 6 is a flowchart showing a reservation process in the first embodiment.
Figure 7:
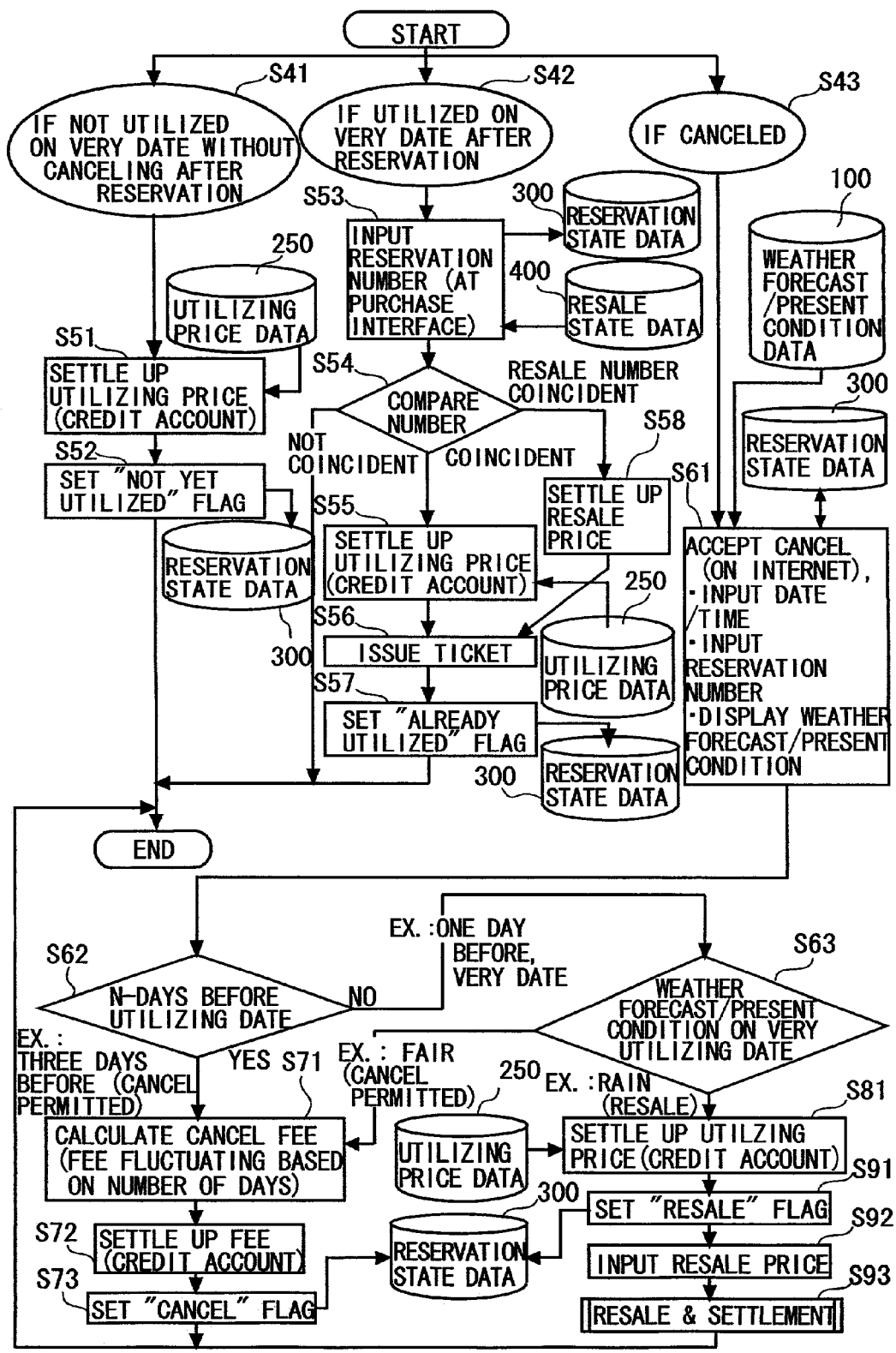
FIG. 7 is a flowchart showing a cancel-and-settlement process.
Figure 8:
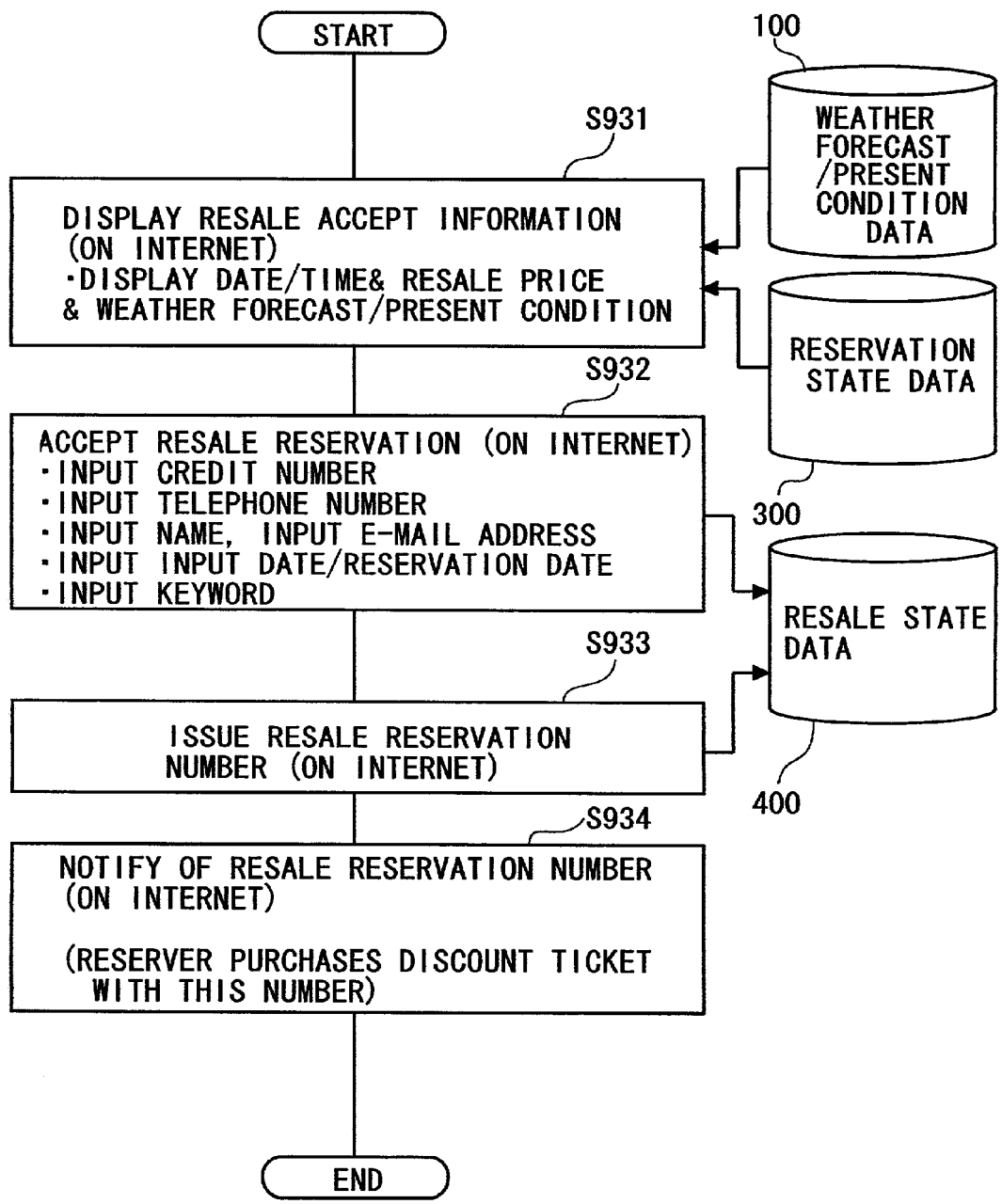
FIG. 8 is a flowchart showing a resale/settlement process in the reservation system.
Figure 10:
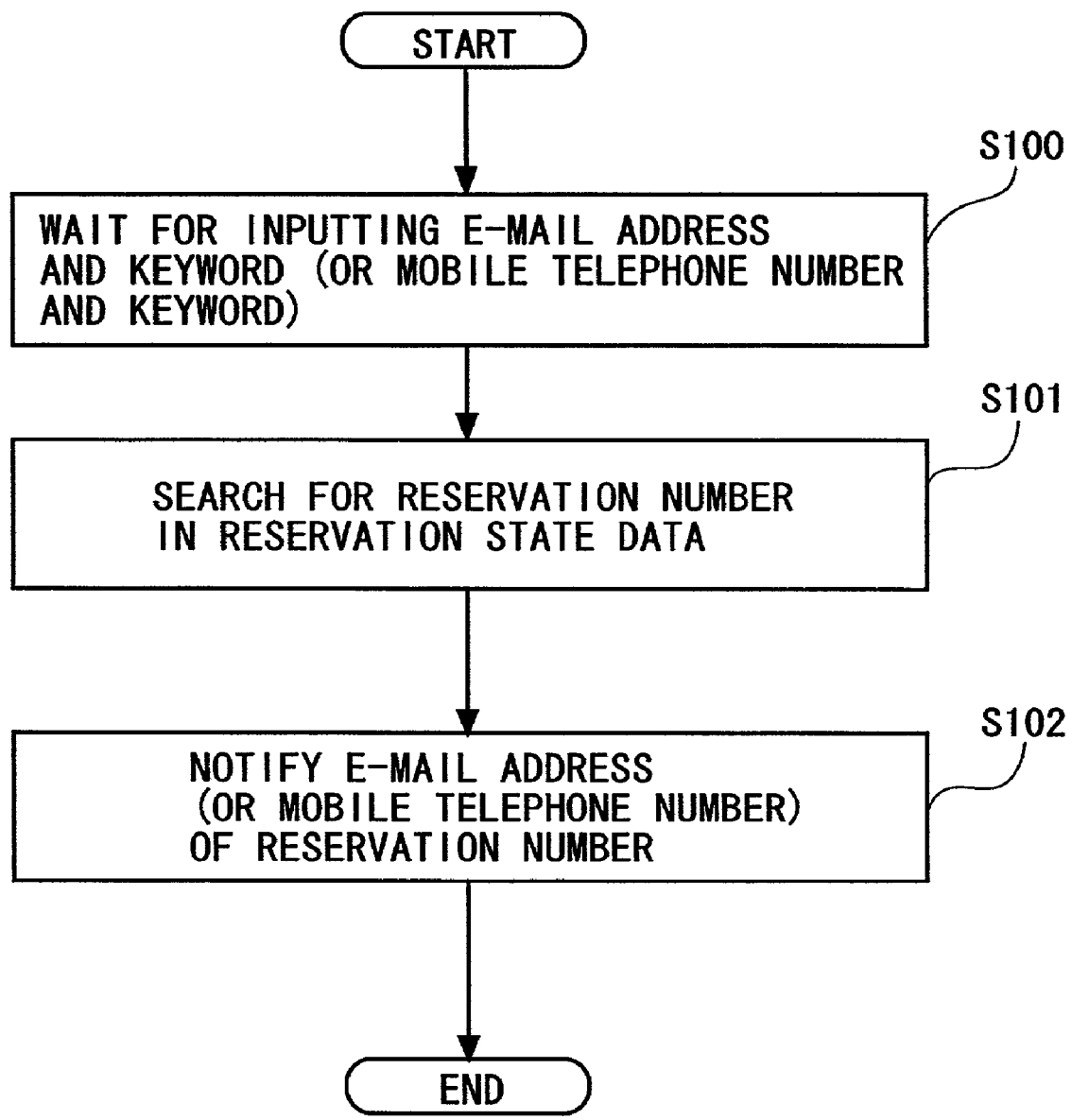
FIG. 10 is a flowchart showing a reservation number response process.

A first embodiment of the present invention will hereinafter be discussed with reference to FIGS. 1 through 10. FIG. 1 is a diagram showing a principle of a reservation system in the first embodiment. FIG. 2 is a view illustrating a system architecture of this reservation system. FIG. 3 is a diagram showing data structures of data managed by the present reservation system. FIG. 4 is a flowchart showing an outline of processes in the present reservation system. FIG. 5 is a flowchart showing a price determining process in the present reservation system. FIG. 6 is a flowchart showing a reservation process in the present reservation system. FIG. 7 is a flowchart showing a cancellation/settlement process in the present reservation system. FIG. 8 is a flowchart showing a resale/settlement process in the present reservation system. FIG. 9 is a diagram showing an image of a resale reservation accept screen in the present reservation system. FIG. 10 is a flowchart showing a reservation number response process in the present reservation system.

Principle of Reservation System

FIG. 1 is the diagram showing the principle of the reservation system in the first embodiment. Demands for some of commercial articles and services depend on the weather and weather forecast. The present reservation system supports selling commercial articles on a reservation basis and reserving services. Herein, the commercial articles are, for instance, an air-conditioner, summer clothing, winter clothing, an admission ticket of an amusement park, an admission ticket of an event site and so on. The services are, for example, an installation of the air-conditioner, providing vehicles and food and drink at the amusement park, holding the event and so forth.

For instance, the admission tickets of the amusement park and of the event site will be considered by way of one example of the articles. An entrance date is to be specified with respect to this type of admission ticket as the case may be. Further, an outdoor event is to be held on only limited days.

Those types of amusement parks and outdoor events have such a tendency that the number of reservations for the admission tickets decreases on days having undesirable weather forecasts. Such being the case, the present reservation system schemes to increase the number of reservations by giving such benefits to users as to discount prices of the commercial articles (or prices of the services) on the days exhibiting the undesirable weather forecasts, thus supporting a link to an increase in proceeds on the whole as a result of this.

As shown in FIG. 1, the present reservation system obtains information on the weather forecasts from a meteorological company at a predetermined time. Then, the present reservation system sets, based on the weather forecast information, an article price and a price (charge) for providing the service. For example, if the weather forecast on a specified day for an entrance into the amusement park says that it will be rain, the reservation system reduces a price of this admission ticket from the normal price. Whereas if the weather forecast on the specified date for the entrance into the amusement park says that it will be fair, the reservation system keeps the normal price of this admission ticket.

With this scheme of setting the price, it might happen the user is tempted by the discount price to purchase the article or reserve using the service beforehand even if rain is forecasted for the service using day (for example, the day of using the admission ticket at the amusement park).

System Architecture

FIG. 2 is the view illustrating the system architecture of the present reservation system. This system is configured by traders computers 1 for managing information of traders for offering the commercial articles and providing the services, a weather forecast server 2 for providing information on the weather forecasts, and an ASP server 3 of an application service provider that executes distributing Web pages to the users and distributing the weather forecast information to the traders.

The traders computers 1 manage the information on the articles to be offered and the services to be provided, e.g., the prices of the articles offered, states of the reservations and soon. The traders computers 1 disclose the article prices, service providing prices, the states of the reservations and others on the Internet via the ASP server 3.

The weather forecast server 2 distributes the weather forecast information based on weather observation information and weather simulations to the traders computers 1 via the ASP server 3. The weather forecast server may, however, distribute the weather forecast information directly to the traders computers 1 without through the ASP server 3.

The ASP server 3 relays the information from the weather forecast server 2 to the traders computers 1. Further, the ASP server 3 distributes to terminals of the users a Web page containing the price information and the information showing the states of the reservations uploaded from the traders computers 1. Each of the traders computers 1, the weather forecast server 2 and the ASP server 3 is a general type of computer including a CPU, a memory, a hard disk, a communication interface with the network and so on.

Based on this architecture, the article vendors (the event holding traders (promoters) including a theme park entrepreneur, a home delivery company, a hotel proprietor and so forth) fluctuate the article prices corresponding to a result of the weather forecast. These processes are actualized as a program on the traders computers 1.

For instance, the result of the weather forecast say that the weather on the service using day is undesirable, the traders computers 1 put not the normal charges but discounted charges on the Web page, and accept the reservations. This scheme prevents the number of the users from decreasing on the day when the weather is to be undesirable.

The users access the Web page provided by the ASP server 3 via the Internet from personal computers, cable TV systems, digital TVs, personal digital assistants (PDAs), mobile telephones and PHSs (Personal Handyphone Systems) (which will hereinafter be generically called terminals), thus making reservations for purchasing the articles and using the services.

Architectures and operations of these terminals are broadly known nowadays, and hence their explanations are omitted.

Data Structure

FIG. 3 is the diagram showing the data structures of the data managed by the present reservation system. The data managed in the present reservation system are a weather forecast data 100 distributed from the weather forecast server 2, a price information data 200 defined as a basic data for determining prices of the articles and charges for the services, a utilizing price data 250 set based on the weather forecast data 100 and the price information data 100, a reservation state data 300 for managing the states of the reservations and a resale state data 400. These data are stored in unillustrated hard disks of the traders computers 1.

The weather forecast data 100 is created in the weather forecast server 2 of the meteorological company and periodically distributed to the traders computers 1. The weather forecast data 100 contains the present condition of the weather as well as the weather forecast information. Therefore, the weather forecast data 100 is described as a "weather forecast/present condition data" in FIG. 3. The "weather forecast/present condition data" containing the present condition of the weather will hereinafter simply be called weather forecast data.

As shown in FIG. 3, the weather forecast data 100 has records sorted based on date/time serving as a key. Each of the records of the weather forecast data 100 consists of pieces of data entered in a "date/time" field, a "weather" field, a "temperature" field and a "wind" field.

Namely, each record of the weather forecast data 100 retains weather information (fair, cloud, rain etc) and predicted values of a temperature and a wind velocity at a specified time on a specified date, for instance for a time of 9:00 am through 12:00 pm on April 1. The record containing the present date/time in the "date/time" field retains a present condition value.

Each of records of the price information data 200 has weather conditions and a discount rate under these weather conditions. The weather conditions are, e.g., a weather, a temperature a wind (wind velocity) and so on. The weather conditions are not limited to those given above in the embodiments of the present invention. The weather conditions may include, for example, a humidity, a snowfall, a moon phase and, if any, a variety of alarms.

Each of the records of the price information data 200 retains a discount rate when the respective weather conditions are predicted on the date/time of offering the article and providing the service. Referring to FIG. 3, for example, a discount rate of 10% is set under such conditions that the weather is fair, the temperature is 0 degree or lower, and the wind velocity is 0 m through 0.3 m.

According to the present reservation system, pieces of data in this price information data 200 are set by statistically processing the weather conditions (weathers, temperatures, winds etc) on the past dates/times when the articles were offered and the services were provided, and actual data about the number of users, and by executing a multivariate analysis program. For instance, a correlation analysis, a principal component analysis are known as this type of multivariate analyses.

The correlation analysis is an algorithm for quantitatively obtaining a degree of relationship between two variables x and y on the basis of a correlation coefficient. Further, the principal analysis is an algorithm by which some factors correlated to each other are synthesized into some components, and characteristics thereof are obtained. The algorithms of these multivariate analyses are broadly known, and hence their descriptions are omitted.

The utilizing price data 250 is created for every predetermined article or service, and retains the price or charge thereof. FIG. 3 shows the utilizing price data 250 about one article. As shown in FIG. 3, the utilizing price data 250 has records sorted based on date/time serving as a key. Each of the records of the utilizing price data 250 consists of pieces of data entered in a "date/time" field, a "weather" field, a "temperature" field, a "wind" field and a "utilizing price" field.

Herein, the date/time is a date and a time when offering the article or providing the service. For instance, if the article is an admission ticket of the amusement park, the date/time is a date and a time when scheduled to enter the amusement park. The weather, the temperature and the wind may be conceived as a weather forecast on that date and time. Further, the utilizing price is a sales price of the article or a service charge in the case of that weather forecast. This utilizing price is set based on the weather forecast data 100 and the price information data 200.

The reservation state data 300 retains states of reservations of the respective articles or services. Note that a structure of the resale price data 400 is the same as that of the reservation state data 300. Therefore, what is described in FIG. 3 is the reservation state data & resale state data.

As shown in FIG. 3, each of records in the reservation state data 300 consists of pieces of data entered in a "reserved date" field, a "name of reserver" field, an "electronic mail address" field (e-mail in FIG. 3) as an address of the reserver, a "reservation number (reservation No.)" field, an "input date" field, a "mobile telephone number (mobile phone No.)" field, a "keyword" field, a "utilizing state" field, an "amount of money" field and a "credit card number (credit card No.)" field.

Herein, the reserved date is a date when receiving the article offered or the service provided, for instance, a date of entering the amusement park and a date when the event is held. Further, the "reservation No." field is registered with a number (which will hereinafter be called a reservation number) for uniquely identifying each record in the reservation state data. The mobile telephone is capable of storing the reservation number send by E-mail. Hence, this reservation number is shown on the display of the mobile telephone, whereby the user can purchase the article at a reserved price or can utilize the service.

Further, the keyword is a character string set by the user when reserving the article or the service. If the user fails to remember the reservation number, or if the user happens to delete a mail containing the reservation number that has been sent to the mobile telephone, the user accesses the reservation system from the terminal and is notified of the reservation number showing one-to-one mapping to the keyword registered when making the reservation. The user is notified of it when inputting the E-mail address described above and the keyword or the mobile telephone number and the keyword.

The utilizing state shows a state of the article or the service after making the reservation. The "utilizing state" field is set with a character string such as "cancel", "resale", "already utilized" or "not yet utilized".

"Cancel" indicates that the reservation is canceled. "Resale" implies that the cancel of the reservation is not permitted, and the reserved article or service becomes a resale object. The resale implies that a price of the article reserved by the user or a charge for the service reserved is once paid at the reservation price or charge, and thereafter the article or service is sold to a third party.

"Already utilized" implies that the user received the article or was provided with the service, for example, the user used the admission ticket of the amusement park.

Further, "not yet utilized" implies that the user made the reservation but did not yet receive the article and provision of the service. Accordingly, if it comes to a utilizing date of the service in a wait-for-resale state, only a fee is paid even if the service is not provided, and hence "not yet utilized" is set in the "utilizing state" state.

The "amount of money" field is recorded with an amount of money corresponding to the utilizing state. For instance, if "cancel" is set in the "utilizing state" field, a fee for canceling is recorded in the "amount of money" field.

Moreover, if "resale" is set as the utilizing state, a resale price is recorded in the "amount of money" field. If "already utilized" and "not yet utilized" are set in the "utilizing state"

field, utilizing prices corresponding thereto are recorded in the "amount of money" field.

Note that a data structure of the resale state data 400 is the same as that of the reservation state data 300, and hence its explanation is omitted.

Operation

FIG. 4 is the flowchart showing the outline o f the processes in the present reservation system. These processes are actualized as a computer program on the traders computer 1. These processes start with a step in which the reservation system at first obtains the weather forecast data 100 from the weather forecast server 2 of the meteorological company (S1). Then, the reservation system sets autilizing price based on the weather forecast data 100 obtained, and starts reserving the article or the service (S2).

Next, the reservation system executes a reservation process (S3). In this process, the reservation system waits for the user to input reservation information on the Web page through the ASP server 3. The user accesses the Web page, then confirms the utilizing price of the article or the utilizing charge for the service, and sets the reservation information. The reservation information contains, e.g., the reservation date (a utilizing schedule date of the article or the service), the E-mail address, the mobile telephone number, the keyword and others.

The process after the reservation differs depending on a behavior of the user (S4). Namely, if the user actually utilizes the reserved article or service, the reservation system has a fee settled up, and provides the article or the service. For instance, the reservation system issues a ticket for utilizing the service (S5).

When the user proposes to cancel the reserved service (S6) and if the cancel is permitted, the reservation system has a cancel fee settled up (S7).

When the user proposes to cancel the reserved service (S6) and if the cancel is not permitted, the reservation system has a charge for utilizing the service, i.e., a reservation fee settled up (S8). In this case, the user places on a resale site the article or service of which the price or charge has been paid without being able to cancel it, thus recruiting resale users. If the resale user responds to the resale, the reservation system executes a resale process (S9).

FIG. 5 is the flowchart showing the price determination process (S1 and S2 in FIG. 4) in detail in the present reservation system. In this process, to begin with, the reservation system obtains the weather forecast data 100 (containing the present condition data) from the weather forecast server 2 of the meteorological company, and saves this weather forecast data 100 on the unillustrated hard disk (S10).

Next, the reservation system determines, based on the weather forecast data 100 and the price information data 200, a utilizing price of the article or a utilizing charge for the service (S11). The determined utilizing price or charge is saved as the utilizing price data 250 on the hard disk.

Subsequently, the reservation system waits for the weather forecast data 100 to be updated (S12). When the weather forecast server 2 of the meteorological company updates the weather forecast data 100, the reservation system returns the control to S10.

FIG. 6 is the flowchart showing the reservation process (S3 in FIG. 4) in the present reservation system. In this reservation process, to start with, the reservation system displays reservation accept information on the Web page on the Internet via the ASP server 3 (S30). The reservation accept information contains the reservation date/time (date/time of providing the service etc), the utilizing price, the weather forecast and the present condition. The reservation accept information is created with reference to the weather forecast data 100 and the utilizing price data 250 stored on the hard disk.

Next, the reservation system waits for an input from the user and accepts the reservation (S31). If the user makes the reservation, a credit number, a telephone number, a name, an E-mail address, an input date (date on which the user reserved)/reservation date (date of utilizing the service etc) and a keyword, are set and inputted to the reservation system. Inputted pieces of information are stored as the reservation state data 300 on the hard disk.

Next, the reservation system issues a reservation number (S32). The reservation number issued is registered in the "reservation No." field in the reservation state data 300.

Subsequently, the reservation system notifies the user of the reservation number. The user is notified of the reservation number by an E-mail via the Internet. Thereafter, the reservation system finishes the reservation process. Note that the reserver (user) purchases a ticket in a predetermined fee by using this reservation number. For example, if a weather forecast on the reservation date is undesirable, the reserver purchases the ticket in a discount fee.

FIG. 7 is the flowchart showing the cancel-and-settlement processes (S4 through S9 in FIG. 4) in detail according to the reservation system. Note that FIG. 7 contains a process of settling up the utilizing fee if the user did not utilize the reserved service etc without canceling it after the reservation, and a process executed when the user utilizes the service etc as it is reserved.

As shown in FIG. 7, this process diverts depending on a behavior of the user after the reservation. At first, if the user neither cancels nor utilizes on the very date after the reservation (S41), the reservation system has the utilizing fee settled up by a payment out of a user's own credit account (S51). In this case, the utilizing fee is defined as a utilizing price when making the reservation.

Next, the reservation system sets "not yet utilized" in the "utilizing state" field in the reservation state data 300 about this user (S52). Thereafter, the reservation system finishes the cancel-and-settlement process.

Further, when the user utilizes the service on the very date of providing the service after the reservation, the user shows the reservation number at, for instance, an article purchase interface (ticket sales window etc) and makes a request for inputting the reservation number and the keyword (S53). In this case, however, the purchase of the article includes a purchase of a resale article.

Then, the reservation system searches, based on the inputted reservation number and keyword, the reservation state data 300 or the resale state data 400. Next, the reservation system judges whether the inputted reservation number and keyword are identical with those recorded in the reservation state data 300 or the resale state data 400 (S54).

If the inputted reservation number and keyword are not identical with those recorded in the reservation state data 300 or the resale state data 400, the reservation system finishes the cancel-and-settlement process.

Whereas if the inputted reservation number and keyword are identical with those recorded in the reservation state data 300 or the resale state data 400, the reservation system has the utilizing fee settled up by a payment from the user's own credit account (S55).

Next, the reservation system issues, e.g., a ticket for utilizing the service (such as an admission ticket of the amusement park and so on) (S56).

Subsequently, the reservation system sets "already utilized" in the "utilizing state" field in the reservation state data 300 about this user (S57). Thereafter, the reservation system finishes the cancel-and-settlement process.

On the other hand, if the inputted reservation number and keyword are coincident with the resale number and the keyword recorded in the resale state data 400, the reservation system executes are sale fee settlement process (S58). In this process, the reservation system at first has a resale fee settled up by a payment from the user's own credit account. This resale fee is paid once into an account of an administration company that administers the reservation system. Then, the reservation system gives an instruction of paying the resale fee into a predetermined bank account of the resale user. As a result, the resale fee is deposited into the bank account of the resale user.

Next, the reservation system issues, e.g., the ticket for utilizing the service (such as an admission ticket of the amusement park and so on) (S56). The processes following this process are the same as those when the reservation number and the keyword are identical with those recorded on the reservation state data 300.

Further, if the user cancels the reserved article or service, to begin with, the reservation system accepts the cancel (S61). In this case, the user inputs the reservation number onto the Web site for accepting the cancel. Further, the reservation system refers to the present date and time and also the weather forecast data 100.

Then, the reservation system judges whether the present date (time) falls within a predetermined number of days (FIG. 7 shows an N-number of days) before the utilizing date (reservation date) (S62). If the present date (time) falls within the predetermined number of days, e.g., three or more days before the utilizing date, the reservation system permits the cancel.

Then, the reservation system calculates a cancel fee (S71). This cancel fee is calculated based on the number of days up to the utilizing date. Next, the reservation system has this fee settled up by a payment from the user's own credit account (S72).

Subsequently, the reservation system sets "cancel" in the "utilizing state" field in the reservations state data 300. Thereafter, the reservation system finishes the cancel-and-settlement process.

Further, if it is judged in S62 that the present date is less than the predetermined number of days up to the utilizing date, the reservation system judges a weather on the very utilizing date (reservation date) by referring to the weather forecast data 100 (S63). If the weather on the very utilizing date is not undesirable, e.g., fair, the reservation system permits the cancel of the user. The processes following this process are S71 through S73.

Whereas if the weather on the very utilizing date is undesirable, e.g., rain, the reservation system does not permit the cancel. In this case, the reservation system has once the user settle up the utilizing price of the reserved article or charge for the reserved service, which is set when making the reservation (S81), and prompts the user to register the reserved article or service on the Web page (resale site).

Namely, the reservation system sets "resale" in the "utilizing state" field in the reservation state data 300 (S91). Next, the reservation system prompts the user to input a resale price of the article of service (S92).

Then, the reservation system starts the resale process (S93). In this process, the reservation system executes a process for a third party's purchase request for the resale article or service. Thereafter, the reservation system finishes the cancel-and-settlement process.

FIG. 8 is the flowchart showing details of the resale-and-settlement process (S93 in FIG. 7). In this process, at first, the reservation system displays resale accept information on the Web page on the Internet via the ASP server 3 (S931). The resale accept information contains a utilizing date, a resale price and a weather forecast on the very utilizing date.

Next, the reservation system accepts a resale reservation on the Web page (S932). FIG. 9 shows a resale reservation accept screen of the Web page in this case. As illustrated in FIG. 9, pieces of resale information (a utilizable date, a weather forecast on the utilizable date and a resale price) are displayed in an upper area on the screen.

Further, a reservation input screen for the resale user is displayed in a lower area on the screen. A credit number, a telephone number, a name, an E-mail address, a reservation input date, a reservation date (utilizing date) and a keyword, are inputted on this reservation input screen for the resale user. The resale user inputs these pieces of information and presses a decision button, thereby establishing a resale reservation. Then, the reservation system registers the inputted pieces of information in the resale state data 400. The user may, however, close the screen by pressing a cancel button without reserving the resale.

When the user sets the information on the resale reservation input screen and presses the decision button, the reservation system issues a resale reservation number (S933). The reservation system also registers this resale reservation number in the resale state data 400.

Next, the reservation system notifies the resale user of the resale reservation number. This notification is done by an E-mail on the Internet. The resale user (reserver) shows this resale reservation number and thus purchases a resale article or service, e.g., a ticket at a discount price on a resale basis. Thereafter, the reservation system finishes the resale-and-settlement process.

FIG. 10 is the flowchart showing a reservation number response process in the reservation system when the user forgets the reservation number and inquires of the reservation system. IF the user forgets the reservation number, the user accesses a predetermined Web page in the reservation system and requests the reservation system to search for the reservation number.

In that case, the reservation system waits for the user to input the user's own E-mail address and keyword (which are those set when making the reservation) (S100). In this case, the E-mail address is used as a search key for the reservation state data 300 and as a response destination of a result of the search. Note that a mobile telephone number and a keyword may also be inputted as substitutes for the E-mail address.

When the user completes inputting the E-mail address and keyword (or the mobile telephone number and the keyword), the reservation system searches the reservation state data 300 with the E-mail address (or the mobile telephone number) serving as a search key (S101).

Then, the reservation system reads the reservation number from the "reservation No." field of the record containing the relevant E-mail address and key word (or the relevant mobile telephone number and keyword). Then, the reservation system sends an E-mail for notifying of the reservation number to the above E-mail address (or the mobile telephone number) (S102). Thereafter, the reservation system finishes the reservation number response process.

Effects of Embodiment

As discussed above, the present reservation system obtains the weather forecast data 100 at the predetermined time from the weather forecast server 2, and determines the price for offering the article or for providing the service when making the reservation on the basis of the weather forecast on the date of utilizing the article and the service.

Accordingly, if it is predicted that the number of reservations will decrease due to the undesirable weather, the articles and the services are reserved and sold at predetermined discount prices, whereby fluctuations in proceeds due to the weathers can be decreased.

Further, the user, if the priority is not given to the weather forecast on the very utilizing date, can reserve and purchase the article or service at the discount price.

Moreover, the reservation system in the first embodiment, if the user having made the reservation cancels this reservation, determines based on the number of days up to the utilizing date or the weather forecast on the utilizing date whether the cancel should be permitted. The article or service provider can therefore prevent an occurrence of the cancel just before the utilizing date. Further, the reservation system, if the forecast shows that the weather on the utilizing date will be desirable, permits the cancel even just before the utilizing date, and flexibly determines whether the cancel should be permitted or not corresponding to the state on the utilizing date.

Note that the user having made the reservation on the basis of the information on the weather forecast has an intention of utilizing even if it is rain. Hence, it may be conceived that the user is not dissatisfied with being unable to cancel when the weather on the very utilizing date is rain. On the contrary, if the weather on the very utilizing date is rain, the users who thought it a better option to utilize without making the reservations tend to refrain from utilizing, and therefore a degree of congestion at the facility will be relieved. As a result, the user having reserved will enjoy a sufficient service.

Further, the user, even if unable to cancel, registers the self-reserved article or service on the resale site for putting it on resale, whereby the price of the unnecessary reserved article or service can be recovered up to the limit of a resale price.

Moreover, the third party can purchase and reserve the article at the resale price lower than a normal price.

Modified Example of System Using No Keyword

According to the first embodiment discussed above, the user (reserver), when forgetting the reservation number, inputs the 2-tuple of the mobile telephone number and the keyword or the E-mail address and the keyword, whereby the reservation number is searched for and the user is notified of this searched number. The embodiment of the present invention is not, however, limited to this procedure. For instance, the reservation number may also be searched for with the mobile telephone number or the E-mail address used as a key without specifying the keyword, and the user is notified of this reservation number. The reservation system thus schemed may, if users have reserved the plurality of the articles or services, notify them of a plurality of reservation numbers.

Moreover, according to the first embodiment discussed above, the user is notified of the reservation number addressed to the mobile telephone number or the E-mail address by the E-mail. As a substitute for this notifying mode, however, for example, when the user inputs the 2-tuple of the mobile telephone number and the keyword or the E-mail address and the keyword on the Web page, the reservation number may also be displayed directly on this Web page. In this case, it is desirable that the keyword be inputted in order to prevent an abuse by the third party.

Modified Example of Settlement Procedure for Resale Price

According to the first embodiment described above, the price of the article or service put on resale is settled up when utilizing the article or service (S58 in FIG. 7). The embodiment of the present invention is not, however, confined to this procedure. For instance, there may also be settled up the price of the article or service put on resale when the resale user reserves the resale.

Example of Price Determining Process Taking into Account the Number of Days by Utilizing Date According to the first embodiment discussed above, the utilizing price of the article or service when making the reservation, is determined based on the weather forecast on the very date of utilizing the article or service. In this case, the utilizing price may also be determined further taking into account the number of days up to the utilizing date.

Namely, the result of the weather forecast is periodically updated, and the updated weather forecast shows a result more accurate than the previous forecast. Hence, a higher discount rate maybe given to the user having reserved earlier while giving a lower discount rate to the user who will make the reservation later. Further, the weather forecast shows a higher accuracy as it gets closer to the utilizing date, and hence, for example, if rain is forecasted, a much higher discount rate may be set for the user wishing to utilize in spite of rain.

Second Embodiment

Figure 11:
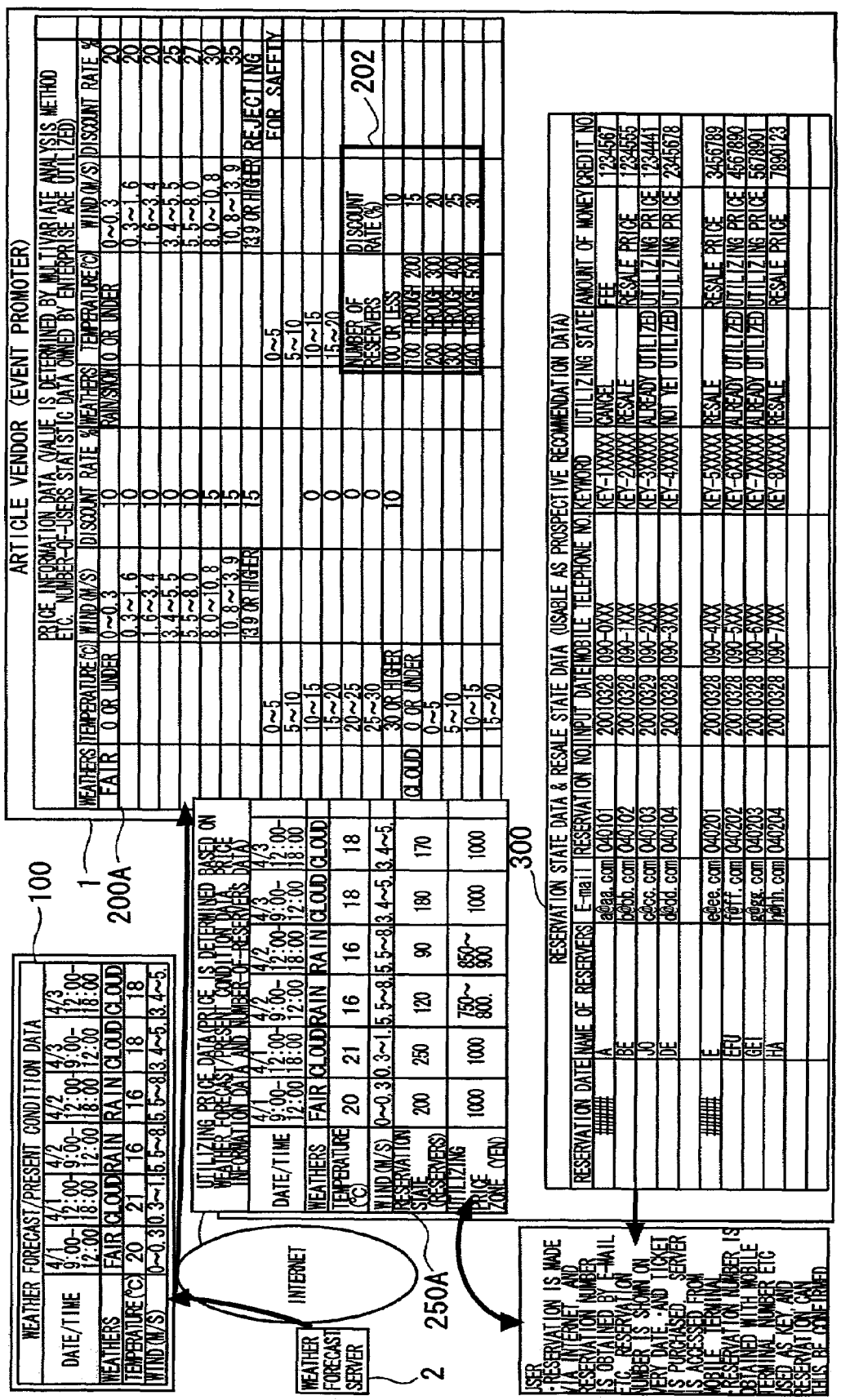
FIG. 11 is a diagram showing data structures of data managed by the reservation system in a second embodiment.
Figure 12:
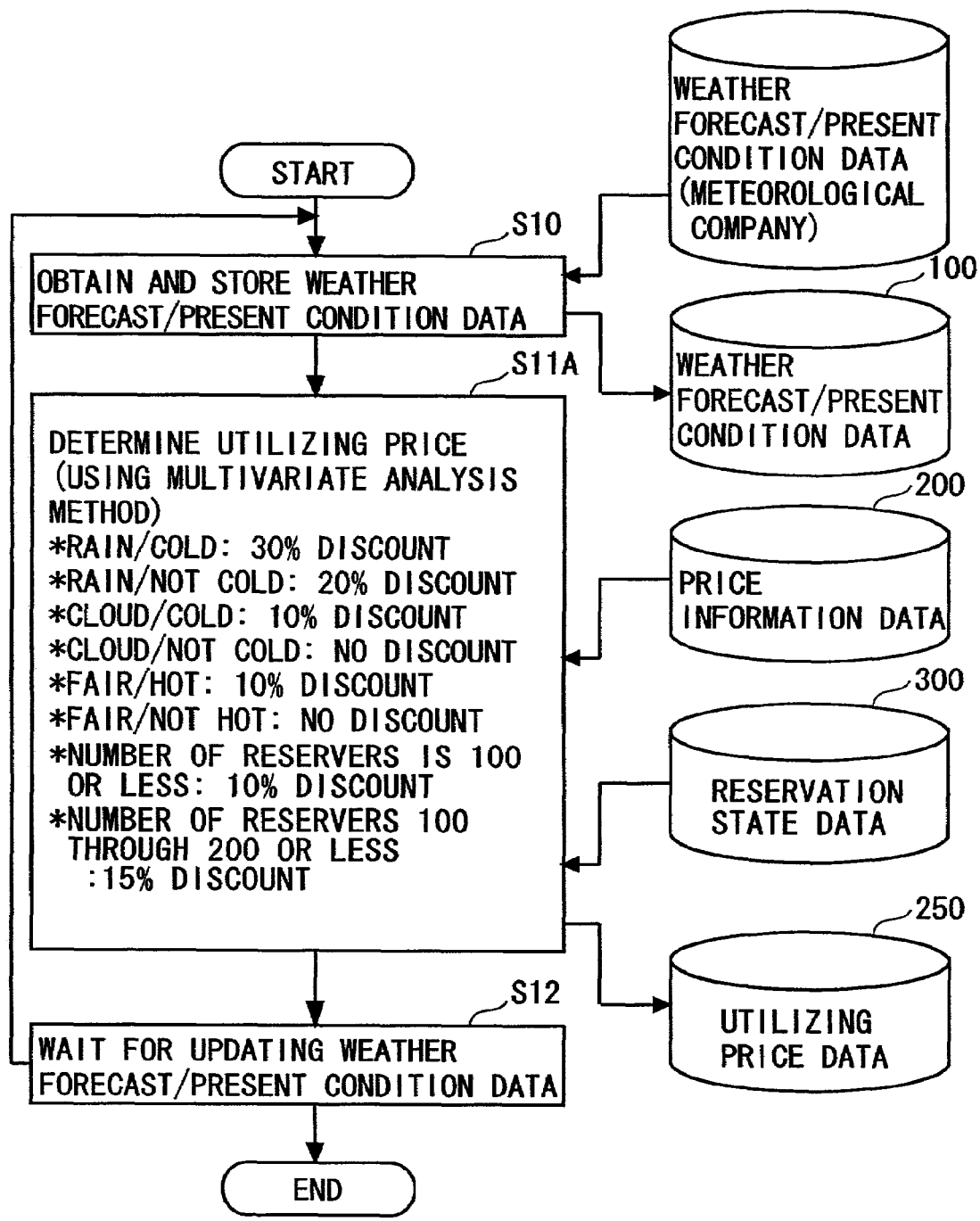
FIG. 12 is a flowchart showing a price determining process in the second embodiment.
Figure 13:
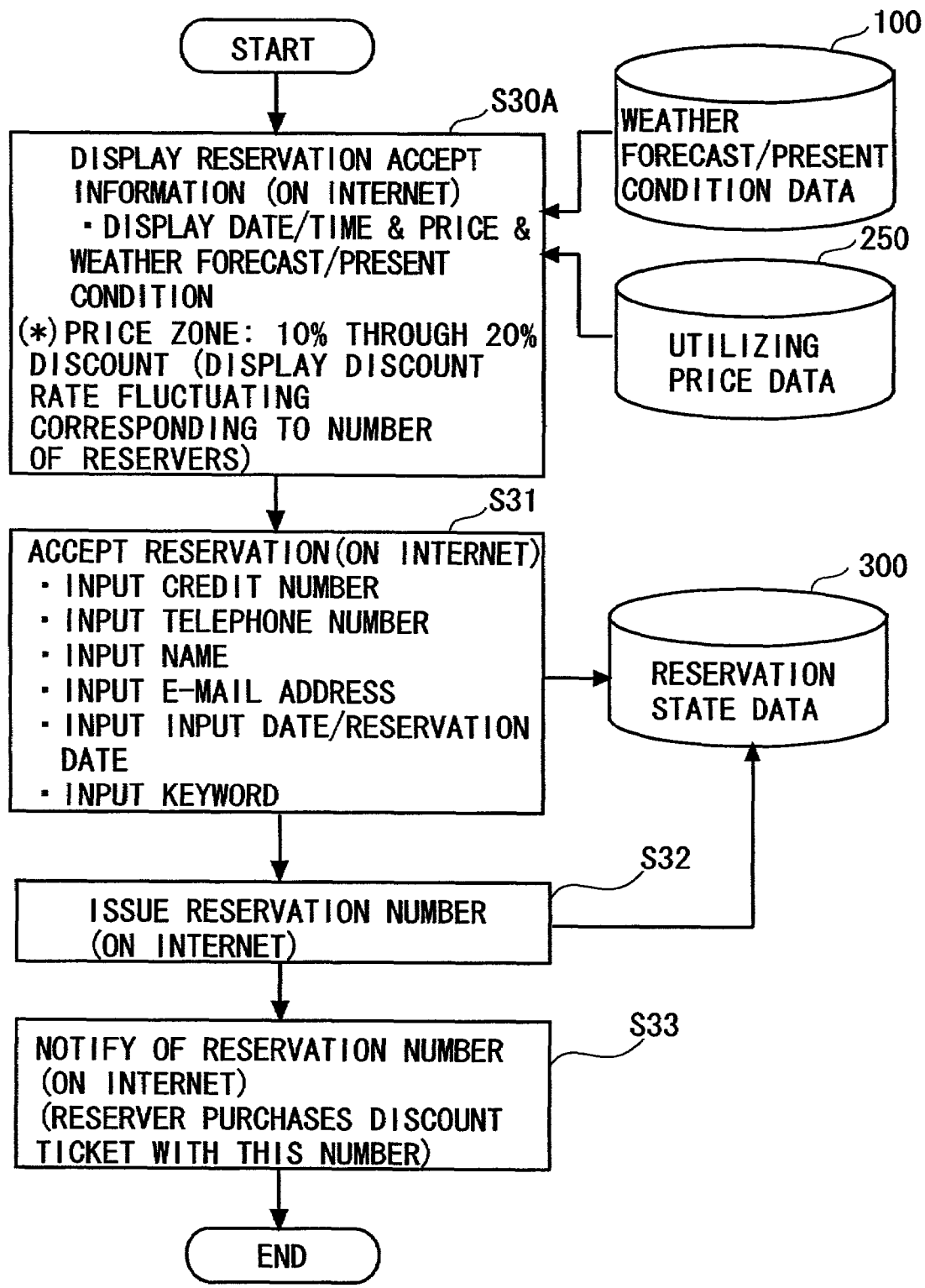
FIG. 13 is a flowchart showing a reservation process in the second embodiment.

The reservation system for the article or service in a second embodiment of the present invention will hereinafter be described with reference to FIGS. 11 through 13. FIG. 11 is a diagram showing data structures of data managed by the present reservation system. FIG. 12 is a flowchart showing a price determining process in the present reservation system. FIG. 13 is a flowchart showing a reservation process in the present reservation system.

The reservation system in the first embodiment determines the price of utilizing the article or the service when making the reservation on the basis of the weather forecast on the date of utilizing the article or service. The reservation system in the second embodiment further reflects a present reservation state in the utilizing price. Other configurations and operations are the same as those in the first embodiment. Then, the same components are marked with the same reference symbols, and their repetitive explanations are here in omitted. Further, the drawings in FIGS. 1 through 10 are referred to according to the necessity.

FIG. 11 is the diagram showing the data structures of the data dealt with by the reservation system in the second embodiment. Referring to FIG. 11, the data other than a price information data 200A and a utilizing price data 250A are the same as those in the first embodiment (FIG. 3).

The price information data 200A has an addition of data of discount rates to the numbers of reservers. For instance, a discount rate 10% is set when the number of reservers is 100 or less, a discount rate 15% is set when the number of reservers is 100 through 200, a discount rate 20% is set when the number of reservers is 200 through 300, and so on. This is because if there are a great number reservers, profits can be ensured on the whole even by setting the discount rate high.

Further, each of records in the utilizing price data 250A in FIG. 11 consists of data entered in a "date/time" field, a "weather" field, a "humidity" field, a "wind" field, a "reservation state" field and a "utilizing price zone" field. This record contains a utilizing price zone for the article or service on the utilizing date/time specified in the "date/time" field.

The utilizing price zone is not strictly the price itself but implies that the utilizing price fluctuates to a predetermined limit, depending on the number of users on the very date. Moreover, the reservation state indicates the number of reservers at the present. This reservation state is finally fixed on the utilizing date/time concerned, and the discount rate is determined corresponding to the number of reservers.

FIG. 12 is the flowchart showing the price determining process in the reservation system according to the second embodiment. In this process, the reservation system, as in the first embodiment, obtains the weather forecast data 100 (S10).

Then, the reservation system determines the utilizing price (S11A). In this case, the present reservation system adds a discount based on the number of reservers at the present time together with the discount rate based on the weather forecast on the utilizing date. For example, if the weather on the utilizing date is rain but is not cold, the discount rate is 30%, however, a 10% discount is added if the number of reservers is 100 or less. Moreover, if the number of reservers is 100 through 200, a 15% discount is added. This discount rate, however, fluctuates momentarily depending on the state of reservations.

The processes after the determining the discount rates are the same as those in the first embodiment, and hence their repetitive explanations are omitted.

FIG. 13 is the flowchart showing the reservation process in the second embodiment. In this reservation process, as in the first embodiment, the reservation system at first displays the reservation accept information on the Web page through the ASP server 3 (S30A).

These pieces of reservation accept information, however, contain a date and time, a price zone and a weather forecast displayed thereon. Namely, according to the second embodiment, a clear-cut utilizing price of the article or service is not shown when making the reservation, however, the price zone (or breadths of the estimated prices and discount rates), which is fluctuates depending on the number of reservers, is displayed. The processes following this process are the same as those in the first embodiment (FIG. 6), and hence their repetitive explanations are omitted.

Modified Example

According to the second embodiment, the discount rate is changed corresponding to the reservation state at the present time, and the higher discount rate is set as there are the greater number of reservers (see FIG. 11). The embodiment of the present invention is not, however, limited to this procedure. For instance, a lower discount rate may be set there are a greater number of reservers. The reason is that there must be a larger quantity of applications for utilizing with a greater number of reservers, and it is therefore possible to ensure the multiplicity of users without increasing the discount rate.

Note that a relationship between the number of reservers, the discount rate and the proceeds may be analyzed by a program for executing the multivariate analysis, and the discount rate estimated optimal corresponding to the number of reservers may also be set by processing of the program.

Third Embodiment

Figure 14:
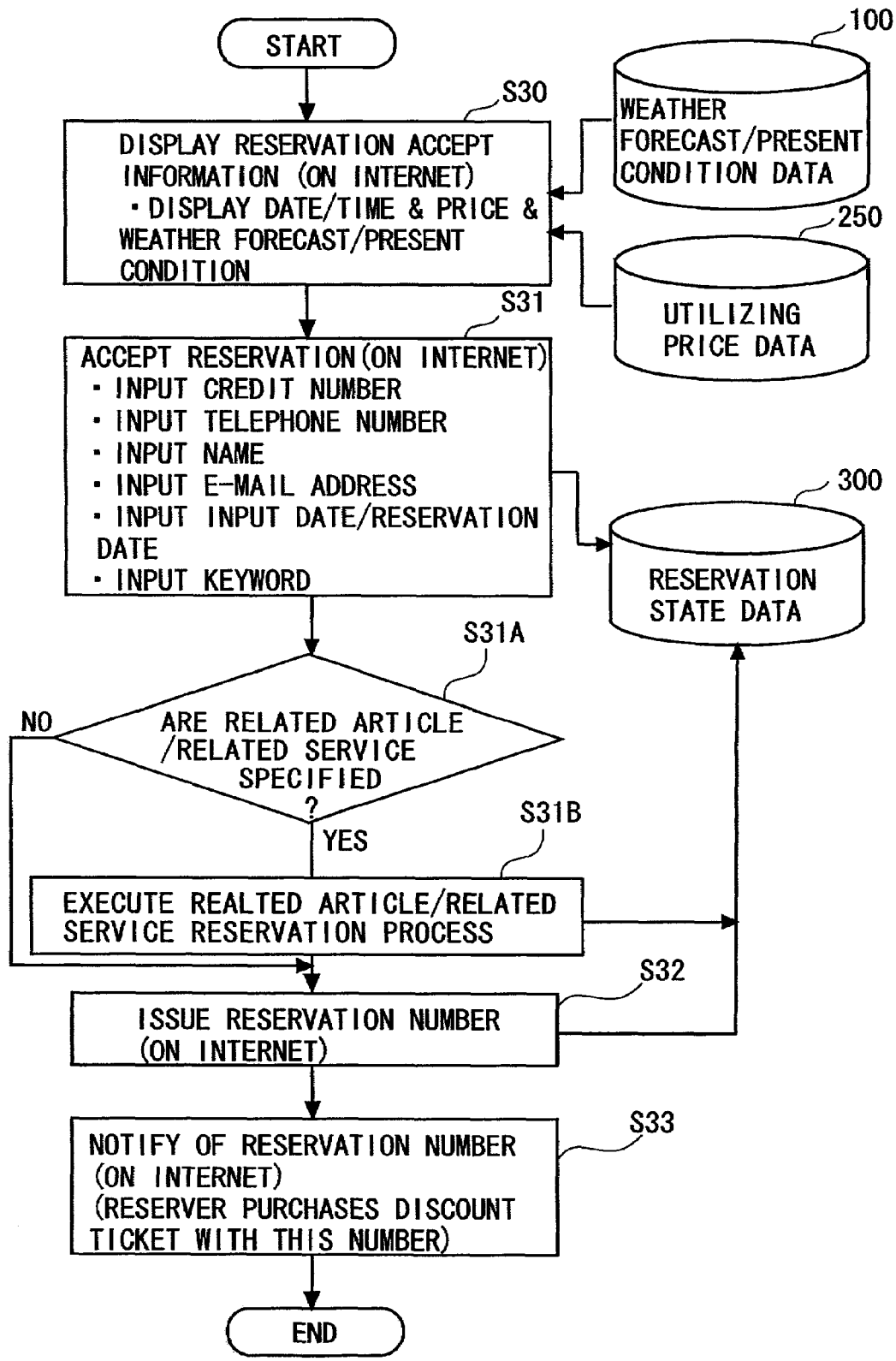
FIG. 14 is a flowchart showing the reservation process in a third embodiment.

The reservation system for the article or service in a third embodiment of the present invention will hereinafter be described with reference to FIG. 14. FIG. 14 is a flowchart showing a reservation process in the present reservation system.

In the first embodiment, the price of utilizing the article or service when making the reservation is determined based on the weather forecast on the date of utilizing the article or service. The reservation system in the third embodiment further provides a function capable of simultaneously reserving a related article (a home delivery service of baggage, a service of utilizing a hotel facility and so on) in a way that takes a serviceability for the user-into consideration. The reservation of the related article needs dealing with in synchronization, and it is therefore preferable that various categories of data (the price information data 200, the weather forecast data 100, the reservation state data 300 etc) be managed on the Web page. Accordingly, it is effective to link to Web pages of the related articles and related services by making use of a Web server administered by an agent.

FIG. 14 is the flowchart showing the reservation process in the present reservation system. The processes in this flowchart are substantially the same as those in the first embodiment (FIG. 6) except for S31A and S31B.

After the reservation accept process (S31) among these processes, the reservation system judges whether the user specifies the reservation of the related article/related service (S31A). This is a judgement about whether the user has traced hyperlinks to a Web page for reserving the related article/related service, starting from on the Web page for accepting the reservation.

If the user specifies reserving the related article/related service, the reservation system executes the reservation process of reserving the related article/related service (S31B). What is done in this reservation process is to reserve the related article or the related service of the reserved article or the reserved service, which has been reserved in the process in S31. A content of this process is the same as that in S31.

The subsequent processes after the reservation number issuing process (S32) onward are the same as those in the first embodiment. Further, the process, if it is judged in S31A that the user does not specify reserving the related article/related service, is the same as that in the first embodiment.

As discussed above, according to the present reservation system, the user can reserve the article or service and can also reserve batchwise the related article or the related service of the reserved article or the reserved service.

Fourth Embodiment

Figure 15:
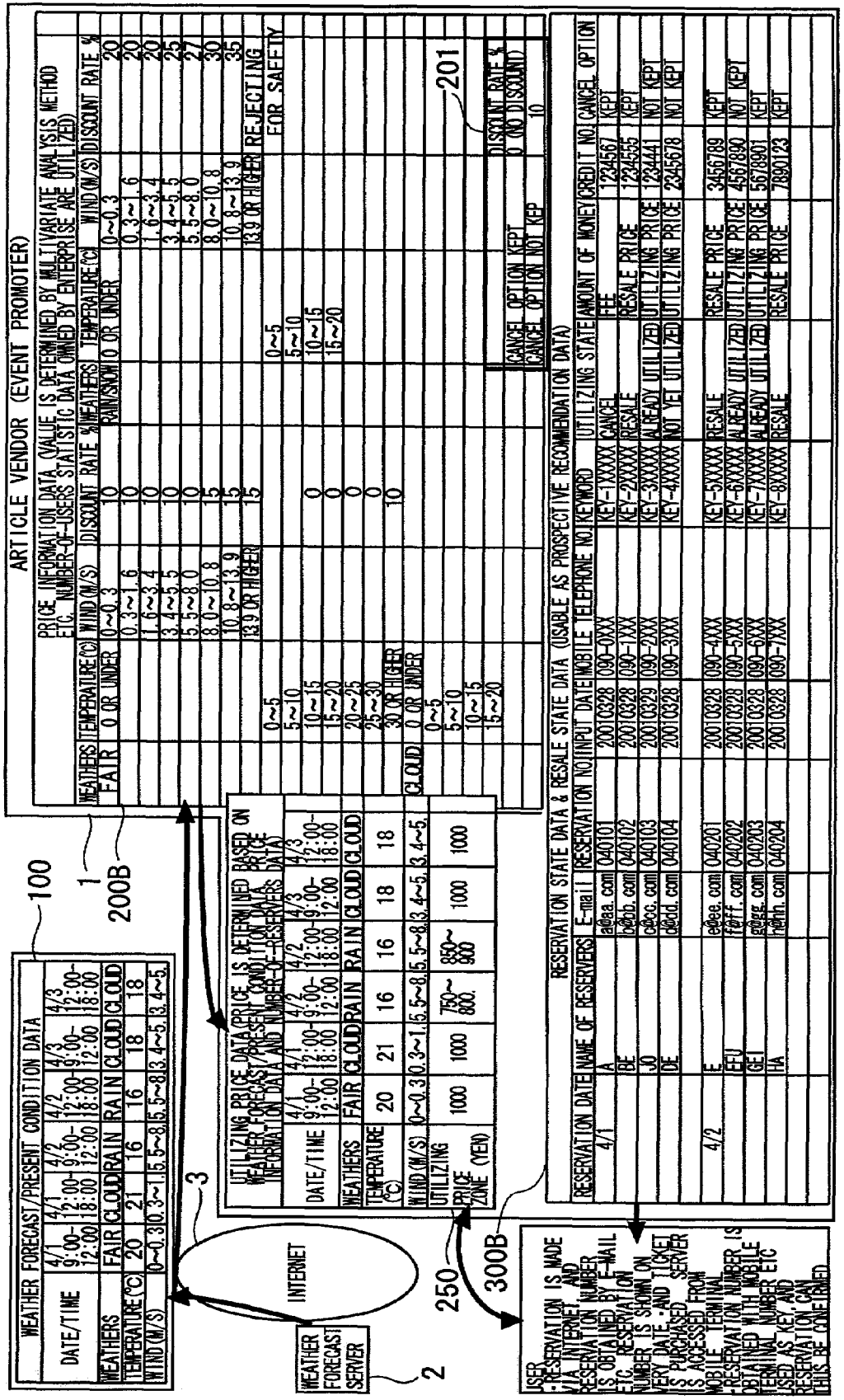
FIG. 15 is a diagram showing data structures of data managed by the reservation system in a fourth embodiment.
Figure 16:
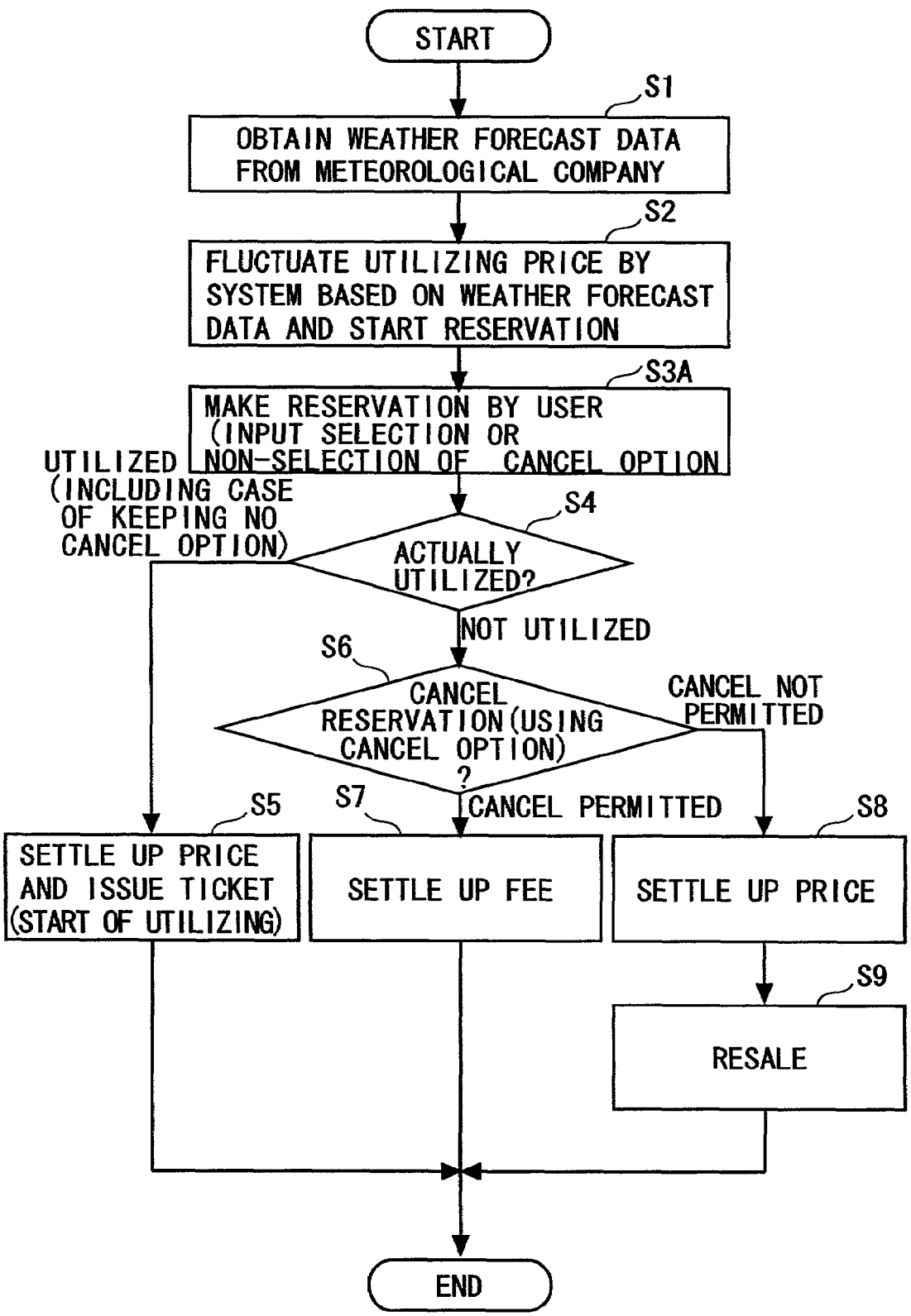
FIG. 16 is a flowchart showing an outline of processes in the reservation system in the fourth embodiment.
Figure 17:
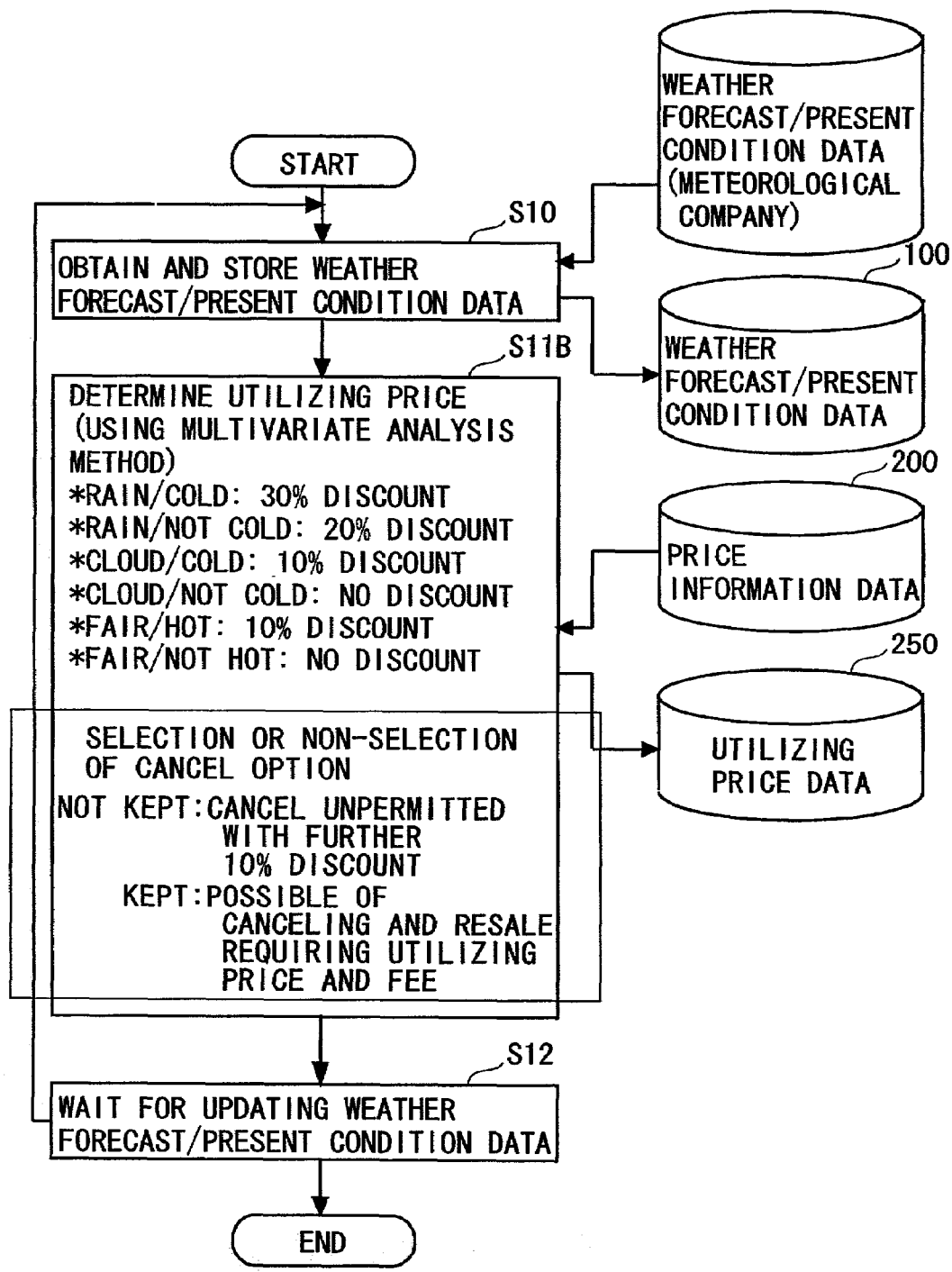
FIG. 17 is a flowchart showing a price determining process in the reservation system in the fourth embodiment.
Figure 18:
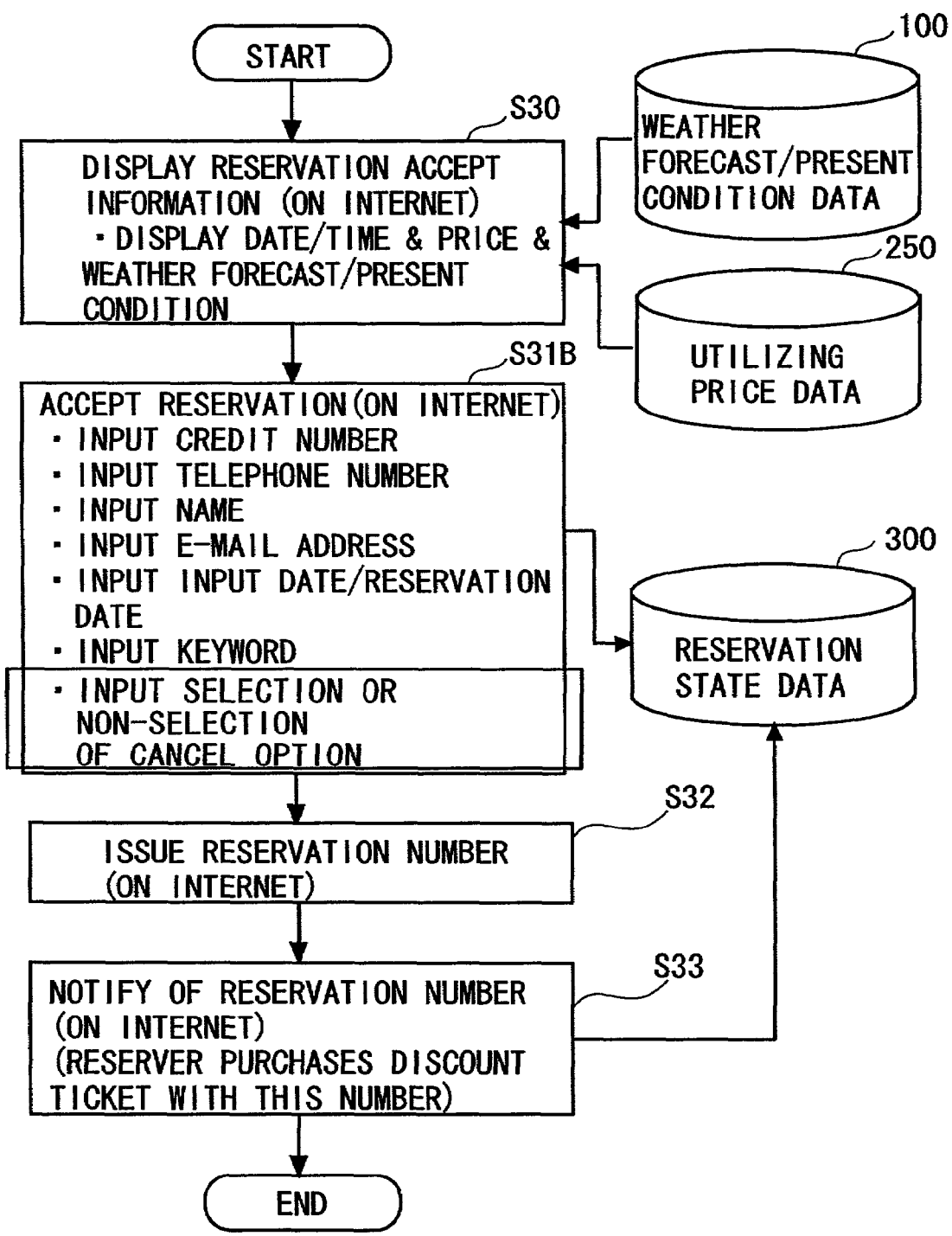
FIG. 18 is a flowchart showing the reservation process in the reservation system in the fourth embodiment.
Figure 19:
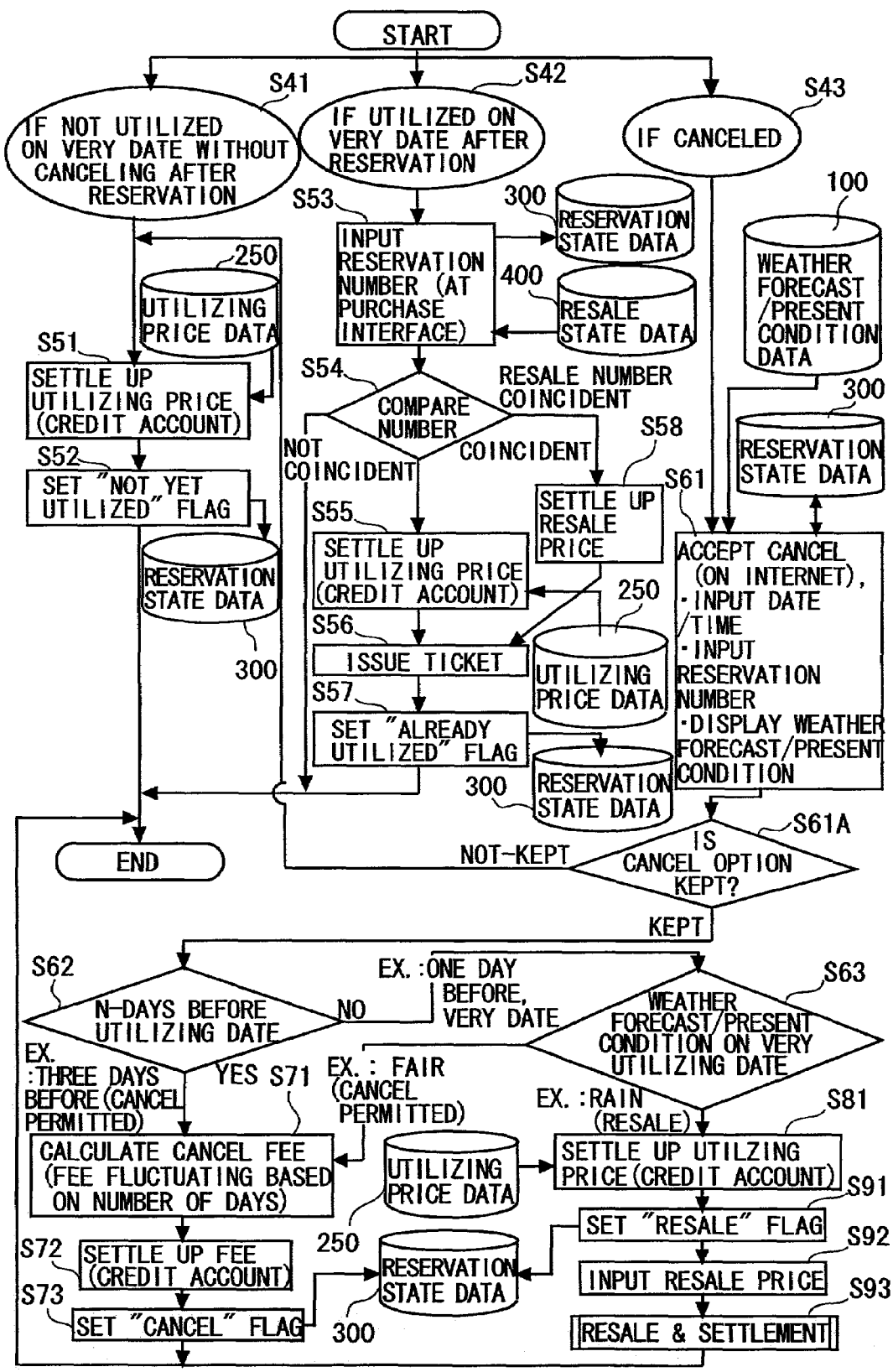
FIG. 19 is a flowchart showing a cancel-and-settlement process in the reservation system in the fourth embodiment.

The reservation system for the article or service in a fourth embodiment of the present invention will hereinafter be described with reference to FIGS. 15 through 20. FIG. 15 is a diagram showing data structures of data managed by this reservation system. FIG. 16 is a flowchart showing an outline of processes in the present reservation system. FIG. 17 is a flowchart showing a price determining process in the present reservation system. FIG. 18 is a flowchart showing a reservation process in the present reservation system. FIG. 19 is a flowchart showing a cancel-and-settlement process in the present reservation system. FIG. 20 is a diagram illustrating an image of a reservation accept screen in the present reservation system.

In the first embodiment discussed above, the price of utilizing the article or service when making the reservation is determined based on the weather forecast on the date of utilizing the article or service, and the user is prompted to reserve the article or service. Further, according to the first embodiment, if the user cancels the reservation, the reservation system judges, based on the number of days up to the utilizing date and the weather forecast on the very utilizing date, whether the user's request for cancel should be permitted or not.

The reservation system in the fourth embodiment is further schemed to prompt the user to select, when making the reservation, whether to have a possibility of canceling the reservation in the future (which may be called "keeping a cancel option") or no possibility of canceling (which may be called "keeping no (quitting) cancel option"). Then, a scheme of this reservation system is that the user keeping no cancel option is, when reserving the article or service, given a higher discount rate than that of the user having the possibility of taking the cancel option.

Other configurations and operations are the same as those in the first embodiment. Then, the same components are marked with the same reference symbols, and their repetitive explanations are herein omitted. Further, the drawings in FIGS. 1 through 14 are referred to according to the necessity.

FIG. 15 is the diagram showing the data structures of the data dealt with by the reservation system in the fourth embodiment. Referring to FIG. 15, the data other than a price information data 200B and a reservation state data 300B are the same as those in the first embodiment (FIG. 3).

According to the fourth embodiment, the price information data 200B has an addition of pieces of discount rate data 201 with respect to whether the cancel option is kept or not (quitted or not quitted). In the example shown in FIG. 15, the user keeping the cancel option is given a discount rate of 0% (no discount), while the user keeping no (quitting) cancel option is given a discount rate of 10%. The user keeping the cancel option may, however, be given a discount rate lower than that of the user keeping no cancel option.

Further, as compared with the first embodiment (FIG. 3), data in a "cancel option" field is added to the record in the reservation state data 300B in FIG. 15. This "cancel option" field is recorded with a result of selecting whether the cancel option is kept by the user ("kept" is set in FIG. 15) or not kept ("not kept" if is set in FIG. 15).

FIG. 16 is a flowchart showing an outline of processes in the present reservation system. These processes excluding a user reserving process in S3A are substantially the same as those in the first embodiment (FIG. 4). In the user reserving process, as in the first embodiment, the reservation system waits for the user to input on the Web page through the ASP server 3. The user accesses the Web page, then confirms a price of utilizing the article or service, and sets reservation information (S3A).

The reservation information, however, further contains information indicating whether the cancel option is kept or not in addition to the reservation date, the E-mail address, the mobile telephone number, the keyword etc which are set in the reservation system in the first embodiment. Then, if the reservation might be canceled, the user specifies keeping the cancel option. This scheme enables the user to retain the possibility of canceling against such a case that it is uncertain to utilize the article or service to be reserved.

Further, if there is no possibility of canceling the reservation, the user specifies keeping no (quitting) cancel option. This scheme enables the user to reserve the article or service at a higher discount rate than in the case of keeping the cancel option.

As in the first embodiment, the process after the reservation differs depending on a behavior of the user (S4). To be specific, when the user actually utilizes the article or service reserved, the reservation system has a price settled up and provides the article or service (S5).

This embraces the case of keeping no cancel option and a case of having actually taken no cancel option though keeping the cancel option has been selected. The reservation system calculates a price at a predetermined discount rate with respect to the user who has specified keeping no cancel option. Moreover, the reservation system calculates a high price at a low discount rate with respect to the user who has selected keeping the cancel option but did not actually cancel.

If the user proposes to cancel the reserved service (S6) and this cancel is permitted, the reservation system has a cancel fee settled up (S7). This case is limited to the occasion of keeping the cancel option.

If the user proposes to cancel the reserved service (S6) but this cancel is not permitted, the reservation system has a service utilizing prices, i.e., a reservation fee settled up (S8). This case is likewise limited to the occasion of keeping the cancel option. Accordingly, the fee settled up becomes a fee higher at a lower discount rate than the case of keeping no cancel option.

The user may put on the resale site the article or service of which the price has been settled up without being able to cancel, and may thus recruit the resale users. If the resale user responds to the resale, the reservation system executes the resale process (S9).

FIG. 17 is a flowchart showing details of the price determining process (S1 through S3A in FIG. 16) in the present reservation system. In this price determining process, the reservation system, as in the first embodiment, obtains the weather forecast data 100 (S10).

Then, the reservation system determines the utilizing price (S11B) In this case, the present reservation system makes the discount rate different depending on whether the user keeps the cancel option or not.

The user who does not select keeping the cancel option is unable to cancel but can receive, e.g., a further 10% discount. While on the other hand, the user who selects keeping the cancel option is able to cancel or make a resale but needs a payment of the utilizing price with no further 10% discount or a payment of a cancel fee.

The processes (S12 to S10) after the utilizing price determining process are the same as those in the first embodiment, and hence their repetitive explanations are omitted.

FIG. 18 is a flowchart showing the reservation process in the fourth embodiment. In this process, as in the first embodiment, to begin with, the reservation system displays the reservation accept information on the Web page through the ASP server 3 (S30).

Next, the reservation system waits for the user to input a reservation information, and accepts the reservation (S31B). The user, when reserving, further sets and inputs to the reservation system whether the cancel option is kept or not in addition to a credit number, a telephone number, a name, an E-mail address, an input date (date on which the user inputs the reservation)/reservation date (date of utilizing the service etc) and a keyword.

FIG. 20 shows a reservation accept screen in that case. As illustrated in FIG. 20, this screen contains input boxes for inputting the credit number, the telephone number, the name, the E-mail address, the input date/reservation and the selection of keeping cancel option or non-keeping. Inputted pieces of information are stored in the form of the reservation state data 300 in the hard disk. The processes following this process are the same as those in the first embodiment.

FIG. 19 is a flowchart showing details of the cancel-and-settlement process (S4 through S9 in FIG. 16) in the present reservation system. This process is substantially the same as that in the first embodiment (FIG. 7), excluding such a point that a judging process in S61A is added.

Namely, if the user cancels the reserved article or service, at first, the reservation system accepts the cancel (S61). In this case, the user inputs the reservation number on the Web site for accepting the cancel. Further, the reservation system refers to the present date/time and the weather forecast data 100.

Next, the reservation system refers to the reservation state data 300B, and judges whether the cancel option is kept in the reservation using the reservation number concerned (S61A) If the cancel option is not kept, the reservation system advances the control to a utilizing fee settlement process in S51. Whereas if the cancel option is taken, the reservation system advances the control to a judging process in S62. The subsequent processes are the same as those in the first embodiment.

As discussed above, according to the reservation system in the fourth embodiment, the user inputs the selection of keeping the cancel option or non-keeping, based on whether the reservation might be canceled or not. Then, the reservation system gives the high discount rate (low price) to the user taking no cancel option when reserving the article or service.

While on the other hand, the reservation system gives the low discount rate to the user who specifies keeping the cancel option when reserving the article or service. Accordingly, the present reservation system supports providing the article or service at the low price to the user who surely utilizes the article or service. By contrast, the reservation system leaves a room for the user to cancel in the future, who is not sure to utilize the article or service.

Fifth Embodiment

Figure 21:
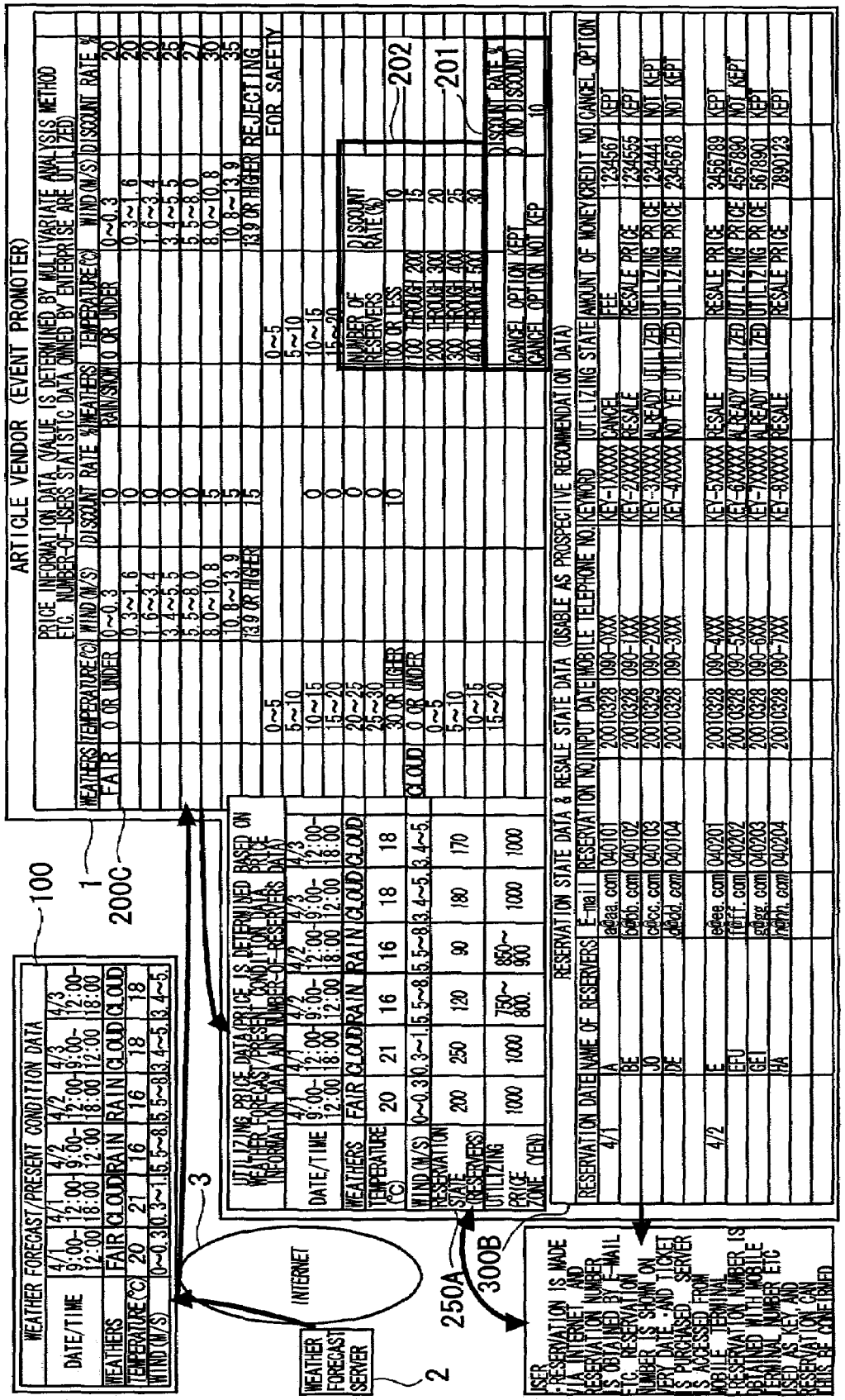
FIG. 21 is a diagram showing data structures of data managed by the reservation system in a fifth embodiment.
Figure 22:
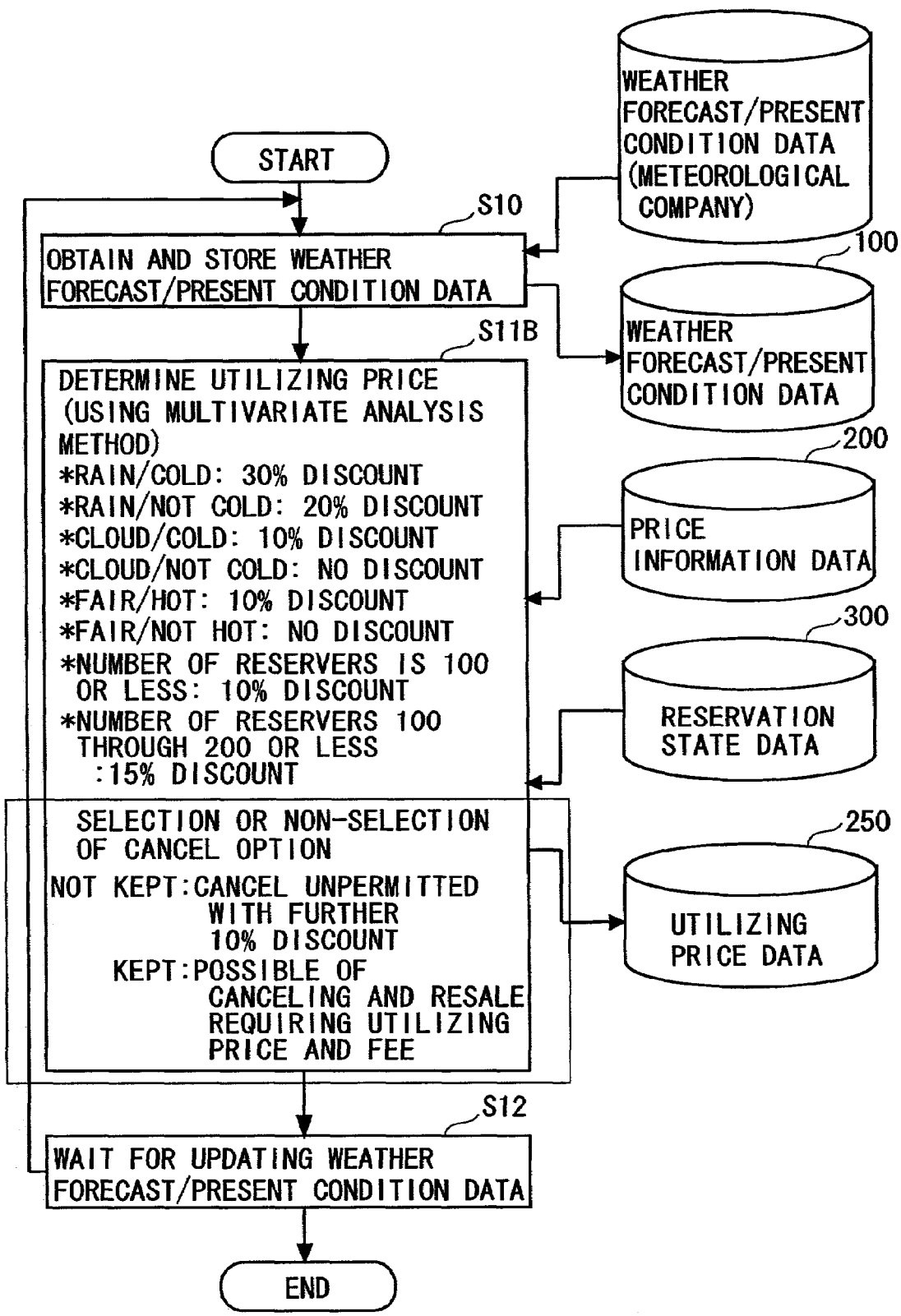
FIG. 22 is a flowchart showing a price determining process in the fifth embodiment.

The reservation system for the article or service in a fifth embodiment of the present invention will hereinafter be described with reference to FIGS. 21 and 22. FIG. 21 is a diagram showing data structures of data managed by the present reservation system. FIG. 22 is a flowchart showing a price determining process in the present reservation system.

In the first embodiment, the reservation system determines the price of utilizing the article or the service when making the reservation on the basis of the weather forecast on the date of utilizing the article or service, and prompts the user to reserve the article or service. Further, the reservation system in the second embodiment determines the utilizing price in a way that reflects the present reservation state. According to the fourth embodiment, the reservation system prompts the user to specify whether the reservation might be canceled or not (whether the cancel option is kept or not) in the future in the reservation described above. Then, the reservation system further reduces the price of the article or service for the user keeping no cancel option.

The discussion in the fifth embodiment will be focused on the reservation system having a combination of the functions in the first, second and fourth embodiments. Other configurations and operations are the same as those in the first embodiment. Then, the same components are marked with the same reference symbols, and their repetitive explanations are herein omitted. Further, the drawings in FIGS.1 through 20 are referred to according to the necessity.

FIG. 21 is the diagram showing the data structures of the data dealt with by the reservation system in the fifth embodiment. Referring to FIG. 21, the data other than a price information data 200C are the same as those in the fourth embodiment (FIG. 15).

According to the fifth embodiment, the price information data 200C has an addition of pieces of discount rate data 202 with respect to the numbers of reservers in addition to the data structure in the fourth embodiment. The discount rate data to the number of reservers are the same as those explained in the second embodiment, and hence the repetitive explanation is omitted.

FIG. 22 is a flowchart showing the price determining process in the reservation system according to the fifth embodiment. In this process, the reservation system, as in the second embodiment, obtains the weather forecast data 100 (S10).

Then, the reservation system determines the utilizing price (S11B). In this case, the present reservation system further adds a discount based on the number of reservers at the present time other than the discount rate based on the weather forecast on the utilizing date. This process is the same as that in the second embodiment. Moreover, the present reservation system is schemed to make the discount rate different depending on whether the user keeps the cancel option or not. This process is the same as that in the fourth embodiment. The processes (S12 to S10) after the utilizing price determining process are the same as those in the first embodiment, and hence their repetitive explanations are omitted.

As discussed above, the reservation system in the fifth embodiment sets the prices by combining the discount based on the weather forecast on the utilizing date, the discount based on the number of reservers at the present and the fluctuations in the discount rate depending on whether the cancel option is selected or not, and then prompts the user to reserve.

Accordingly, the reservation system gives the high discount rate (low price) to the user keeping no cancel option, and the user thus reserves the article or service.

While on the other hand, the reservation system gives the low discount rate to the user who specifies keeping the cancel option, and the user thus reserves the article or service. Therefore, the present reservation system supports providing the article or service at the low price to the user who surely utilizes the article or service. By contrast, the reservation system leaves a room for the user to cancel in the future, who is not sure to utilize the article or service.

Readable-by-Computer Recording Medium

The program executed by a computer to function as the reservation system described above may be recorded on a readable-by-computer recording medium. Then, the computer reads and executes the program on this recording medium, thereby functioning as the reservation system described above.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

Data Communication Signal Embodied in Carrier Wave

Furthermore, the above program may be stored in the hard disk and the memory of the computer, and downloaded to other computers via communication media. In this case, the program is transmitted as data communication signals embodied in carrier waves via the communication media. Then, the computer downloaded with this program can be made to function as the reservation system.

Herein, the communication media may be any one of cable communication mediums such as metallic cables including a coaxial cable and a twisted pair cable, optical communication cables, or wireless communication media such as satellite communications, ground wave wireless communications, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave maybe anyone of a modulated broadband signal and an unmodulated base band signal (corresponding to a case of setting a DC signal having a voltage of 0 as a carrier wave).

What is claimed is:

1. A reservation system for an article or a service, comprising:
    input means for obtaining a weather forecast for a date and at each of geographic areas of providing an article or a service;
    means for setting a price of the article or a charge for the service in accordance with the weather forecast obtained for the date and at the geographic areas;
    accept means for accepting a reservation for purchasing the article at the set price or a reservation for utilizing the service at the set charge to be purchased or utilized on any of the date at any of the geographic areas of providing the article or the service;
    means for issuing a reservation number for uniquely identifying the reservation accepted;
    means for identifying a reserver making the reservation from the reservation number when purchasing the article or when utilizing the service;
    means for receiving a cancel request from the reserver together with the reservation number;
    means for determining, based on the weather forecast on the date of providing the article or the service, whether or not the cancel of the article or the service should be permitted; and
    display control means for controlling a display which is connected to the reservation system to display an outcome of the determination.

2. A reservation system for an article or a service according to claim 1, wherein the date of providing the article or the service is limited, and
    said price setting means sets the price in accordance with the weather forecast on the date of providing the article or the service.

3. A reservation system for an article or a service according to claim 1, further comprising, said accept means accepting a keyword arbitrarily specified together with the reservation and being recorded with a mapping of the reservation number to the keyword, means for making the reserver input the reservation number issued to the reserver and the keyword accepted when issuing the reservation number; and
    means for identifying the reserver by a process that the recorded reservation number and keyword match with the inputted reservation number and keyword.

4. A reservation system for an article or a service according to claim 1, further comprising:
    means for having a destination of data transmission inputted, to which data addressed to the reserver are transmitted;
    means for recording a mapping of the reservation number to the destination of data transmission;
    means for receiving a request for notifying the destination of data transmission of the reservation number; and
    means for notifying the destination of data transmission of the reservation number.

5. A reservation system for an article or a service according to claim 4, wherein the destination of data transmission is an E-mail address or a telephone number of a mobile telephone.

6. A reservation system for an article or a service according to claim 4, wherein said accepting means accepts the keyword arbitrarily specified together with the reservation,
    said recording means records mappings between the reservation number, the destination of data transmission and the keyword, and
    said means for receiving the request has the keyword specified together with the destination of data transmission,
    said reservation system further comprising means for searching for the reservation number by a process that the recorded destination of data transmission and keyword match with the specified destination of data transmission and keyword.

7. A reservation system for an article or a service according to claim 1, wherein said input means periodically obtains a weather forecast, and
    said price setting means sets the price in accordance with a period of time till the service is provided since the weather forecast has been obtained.

8. A reservation system for an article or a service according to claim 1, further comprising means for assisting the reserver having the reservation determined not to be cancelable to put the article or the service determined not to be cancelable on resale for a third party.

9. A reservation system for an article or a service according to claim 1, further comprising means for having a related article or a related service of the reserved article or the reserved service reserved at a price corresponding to a weather forecast when reserving the article or the service.

10. A reservation method for an article or a service, comprising:

obtaining a weather forecast for a date and at each of geographic areas of providing an article or a service;

setting a price of the article or a charge for the service in accordance with the weather forecast obtained for the date and at the geographic areas;

accepting a reservation for purchasing the article at the set price or a reservation for utilizing the service at the set charge to be purchased or utilized on any of the date at any of the geographic areas of providing the article or the service;

issuing a reservation number for uniquely identifying the reservation accepted;

identifying a reserver making the reservation from the reservation number when purchasing the article or when utilizing the service;

receiving a cancel request from the reserver together with the reservation number;

determining, based on the weather forecast on the date of providing the article or the service, whether or not a cancel of the article or the service should be permitted; and controlling a display to display an outcome of the determination.

11. A reservation method for an article or a service according to claim 10, wherein the date of providing the article or the service is limited, and
said setting the price involves setting the price in accordance with the weather forecast on the date of providing the article or the service.

12. A reservation method for an article or a service according to claim 10, further comprising:
accepting a keyword arbitrarily specified together with the reservation;
recording a mapping of the reservation number to the keyword;
making the reserver input the reservation number issued to the reserver and the keyword accepted when issuing the reservation number; and
identifying the reserver by a process that the recorded reservation number and keyword match with the inputted reservation number and keyword.

13. A reservation method for an article or a service according to claim 10, further comprising:
receiving an input of a destination of data transmission to which data addressed to the reserver are transmitted;
recording a mapping of the reservation number to the destination of data transmission;
receiving a request for notifying the destination of data transmission of the reservation number; and
notifying the destination of data transmission of the reservation number.

14. A reservation method for an article or a service according to claim 13, wherein the destination of data transmission is an E-mail address or a telephone number of a mobile telephone.

15. A reservation method for an article or a service according to claim 13, wherein said accepting involves accepting the keyword arbitrarily specified together with the reservation,
said recording involves recording mappings between the reservation number, the destination of data transmission and the keyword, and
said receiving of the request involves having the keyword specified together with the destination of data transmission,
said reservation method further comprising searching for the reservation number by a process that the recorded destination of data transmission and keyword match with the specified destination of data transmission and keyword.

16. A reservation method for an article or a service according to claim 10, wherein said obtaining involves periodically obtaining a weather forecast, and
said setting the price involves setting the price in accordance with a period of time till the service is provided since the weather forecast has been obtained.

17. A reservation method for an article or a service according to claim 10, further comprising assisting the reserver having the reservation determined not to be cancelable to put the article or the service determined not to be cancelable on resale for a third party.

18. A reservation method for an article or a service according to claim 10, further comprising having a related article or a related service of the reserved article or the reserved service reserved at a price corresponding to a weather forecast when reserving the article or the service.

19. A readable-by-computer recording medium recorded with a program, executed by a computer, comprising:
program code obtaining a weather forecast for a date and at each of geographic areas of providing an article or a service;
program code setting a price of the article or a charge for the service in accordance with the weather forecast obtained for the date and at the geographic areas;
program code accepting a reservation for purchasing the article at the set price or a reservation for utilizing the service at the set charge to be purchased or utilized on any of the date at any of the geographic areas of providing the article or the service;
program code issuing a reservation number for uniquely identifying the reservation accepted;
program code identifying a reserver making the reservation from the reservation number when purchasing the article or when utilizing the service;
program code receiving a cancel request from the reserver together with the reservation number;
program code determining, based on the weather forecast on the date of providing the article or the service, whether or not a cancel of the article or the service should be permitted; and
program code controlling a display to display an outcome of the determination.

20. A readable-by-computer recording medium recorded with a program according to claim 19, wherein the date of providing the article or the service is limited, and
said setting the price involves setting the price in accordance with the weather forecast on the date of providing the article or the service.

21. A readable-by-computer recording medium recorded with a program according to claim 19, further comprising:
program code accepting a keyword arbitrarily specified together with the reservation;
program code recording a mapping of the reservation number to the keyword;
program code making the reserver input the reservation number issued to the reserver and the keyword accepted when issuing the reservation number;
program code identifying the reserver by a process that the recorded reservation number and keyword match with the inputted reservation number and keyword.

22. A readable-by-computer recording medium recorded with a program according to claim 19, further comprising:

program code receiving an input of a destination of data transmission to which data addressed to the reserver are transmitted;

program code recording a mapping of the reservation number to the destination of data transmission;

program code receiving a request for notifying the destination of data transmission of the reservation number; and program code notifying the destination of data transmission of the reservation number.

23. A readable-by-computer recording medium recorded with a program according to claim 22, wherein the destination of data transmission is an E-mail address or a telephone number of a mobile telephone.

24. A readable-by-computer recording medium recorded with a program according to claim 22, wherein said accepting involves accepting the keyword arbitrarily specified together with the reservation, said recording involves recording mappings between the reservation number, the destination of data transmission and the keyword, and said receiving of the request involves having the keyword specified together with the destination of data transmission, said reservation method further comprising searching for the reservation number by a process that the recorded destination of data transmission and keyword match with the specified destination of data transmission and keyword.

25. A readable-by-computer recording medium recorded with a program according to claim 19, wherein said obtaining involves periodically obtaining a weather forecast, and said setting the price involves setting the price in accordance with a period of time till the service is provided since the weather forecast has been obtained.

26. A readable-by-computer recording medium recorded with a program according to claim 19, further comprising program code assisting the reserver having the reservation determined not to be cancelable to put the article or the service determined not to be cancelable on resale for a third party.

27. A readable-by-computer recording medium recorded with a program according to claim 19, further comprising program code having a related article or a related service of the reserved article or the reserved service reserved at a price corresponding to a weather forecast when reserving the article or the service.

* * * * *